United States Patent
Potter

(10) Patent No.: US 6,241,911 B1
(45) Date of Patent: *Jun. 5, 2001

(54) OXIDE BASED PHOSPHORS AND PROCESSES THEREFOR

(75) Inventor: Michael D. Potter, Churchville, NY (US)

(73) Assignee: Advanced Vision Technologies, Inc., West Henrietta, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/361,731

(22) Filed: Jul. 27, 1999

Related U.S. Application Data

(63) Continuation-in-part of application No. 08/901,403, filed on Jul. 28, 1997, now Pat. No. 6,071,633, which is a continuation-in-part of application No. 08/900,915, filed on Jul. 28, 1997, now Pat. No. 6,015,326, which is a continuation-in-part of application No. 08/901,505, filed on Jul. 28, 1997, now Pat. No. 6,169,357, which is a continuation-in-part of application No. 09/901,701, filed on Jul. 28, 1997, now Pat. No. 5,965,192.

(60) Provisional application No. 60/032,197, filed on Dec. 2, 1996, provisional application No. 60/032,199, filed on Dec. 2, 1996, provisional application No. 60/032,201, filed on Dec. 2, 1996, provisional application No. 60/025,550, filed on Sep. 3, 1996, provisional application No. 60/025,555, filed on Sep. 3, 1996, and provisional application No. 60/025,556, filed on Sep. 3, 1996.

(51) Int. Cl.[7] .................. C09K 11/67; C09K 11/54; C09K 11/58; C09K 11/66
(52) U.S. Cl. .................. 252/301.4 R; 252/301.6 R
(58) Field of Search .................. 257/301.4 R, 301.5, 257/301.6 R

(56) References Cited

U.S. PATENT DOCUMENTS 2,322,265 * 6/1943 Weyl .................. 252/301.6 R
3,289,100 * 11/1966 Ballman et al. .................. 252/301.4 R
3,459,674 * 8/1969 Emoto et al. .................. 252/301.6 R (List continued on next page.)

FOREIGN PATENT DOCUMENTS 2047462A 11/1980 (GB).
51-151282A 12/1976 (JP).
WO 98/10459 3/1998 (WO).

OTHER PUBLICATIONS

Abstract for JP 51–151282A, Dec. 24, 1976.*

(List continued on next page.)

Primary Examiner—C. Melissa Koslow
(74) Attorney, Agent, or Firm—Theodore R. Touw

(57) ABSTRACT

A phosphor comprises, in atomic percentages, 90% to 100% of a mixed metal oxide MxTyOz, wherein M is a metal selected from Zn, Sn, In, Cu, and combinations thereof, T is a refractory metal selected from Ti, Zr, Hf, V, Nb, Ta, Cr, Mo, W, and combinations thereof, and O is Oxygen, x, y, and z being chosen such that z is at most stoichiometric for MxTyOz; and 0% to 10% of a dopant comprising a substance selected from a rare earth element of the lanthanide series, Mn, Cr, and combinations thereof, or stoichiometrically excess zinc, copper, tin, or indium. Cathodoluminescent phosphor compositions stimulable by electrons of very low energy are prepared from metal oxides treated with refractory metals in various processes disclosed. Metal oxides or mixed-metal oxides of zinc, copper, tin, or indium are heated in the presence of a refractory metal such as titanium, zirconium, hafnium, vanadium, niobium, tantalum, chromium, molybdenum, tungsten, or combinations or alloys thereof to make phosphors of various chromaticities. In a simple embodiment, a quantity of $Ta_2O_5$ is added to a quantity of ZnO and heated at an effective temperature and time to form $Ta_2Zn_3O_8$, which is useful in various forms as a blue-light-emitting phosphor. In preferred embodiments, the phosphors are prepared in situ in an electrically-conductive thin-film or surface-layer form during fabrication of displays.

5 Claims, 20 Drawing Sheets

U.S. PATENT DOCUMENTS

| | | | |
|---|---|---|---|
| 3,560,397 | 2/1971 | Avella | 252/301.6 R |
| 4,152,483 | 5/1979 | Kanda et al. | 428/403 |
| 4,275,333 | 6/1981 | Kagami et al. | 313/495 |
| 4,699,662 | 10/1987 | Nakada et al. | 106/287.13 |
| 5,077,088 | 12/1991 | Jeong | 427/218 |
| 5,120,619 | 6/1992 | Nakajima et al. | 428/690 |
| 5,138,171 | 8/1992 | Tecotzky et al. | 250/484.1 |
| 5,250,366 * | 10/1993 | Nakajima et al. | 252/301.4 R |
| 5,363,012 | 11/1994 | Mizukami et al. | 313/468 |
| 5,455,489 | 10/1995 | Bhargava | 315/169.4 |
| 5,478,499 | 12/1995 | Satoh et al. | 252/301.6 P |
| 5,507,976 | 4/1996 | Bringley et al. | 252/301.4 H |
| 5,518,808 * | 5/1996 | Bruno et al. | 252/301.4 R |
| 5,536,383 | 7/1996 | Van et al. | 204/490 |
| 5,549,843 | 8/1996 | Smith et al. | 252/301.4 H |
| 5,571,451 | 11/1996 | Srivastava et al. | 252/301.4 R |
| 5,601,751 | 2/1997 | Watkins et al. | 252/301.4 R |
| 5,618,216 | 4/1997 | Potter | 445/24 |
| 5,619,098 | 4/1997 | Toki et al. | 313/496 |
| 5,965,192 * | 10/1999 | Potter | 427/64 |

OTHER PUBLICATIONS

Kasper "Die Koordinationsverhaltnisse in Zinkniobat und –tantalat", Zeitschrift Fur anorganische und allgemeine Chemie, vol. 255, No. 1–2, pp. 1–11, Nov. 1967.*

H. W. Leverenz, "Phosphors Versus the Periodic System of the Elements" Proc. I.R.E. (May 1944) pp. 256–263.

H. W. Leverenz, "General Correlations between the Efficiency Characteristics and Constitutions of Phosphors" Proc. Opt. Soc. Am., v. 37 P. 520 (1947)*.

H. Kasper, "Die Koordinationsverhältnisse in Zinkniobat und –tantalat" Zeitschrift Für anorganische und allgemeine Chemie, v. 355, No. 1–2 pp. 1–11 (Nov. 1967).

R. T. Williams et al. "Blue light emission observed in a monolithic thin film edge emission vacuum microelectronic device" J. Vac. Sci. Technol. B, v. 13 No. 2 (Mar./Apr. 1995) pp. 500–504.

R. J. Langley et al. "A New Material for Thin Film Low Voltage Blue Phosphors" presented at 2nd International Conference on Science & Technology of Display Phosphors (San Diego, CA, Nov. 18–20, 1996).

S. K. Kurinec, et al. "Synthesis of Tantalum Zinc Oxide: A New Low Voltage Blue Phosphor" presented at Society for Information Display International Symposium SID '97 (Boston, Mass., May 13–15, 1997).

R. J. Langley et al. "Blue cathodoluminescence from tantalum zinc oxide" Proc. UGIM Symposium, Microelectronics Education for the Future, IEEE, New York, NY (1997) p. 161–164*.

J. J. Brown et al., "Reactions between ZnO and Selected Oxides of Elements of Groups IV and V" Trans. British Ceramics Soc., vol. 64 (1965), pp. 419–437.

M. H. Weichold et al. "Manufacturable vacuum field emission diodes" J. Vac. Sci. Technol. B, vol. 11 No. 2 (Mar./Apr. 1993) pp. 505–510.

J. D. Legg et al. "Improved monolithic vacuum field emission diodes" J. Vac. Sci. Technol. B, vol. 12 No. 2 (Mar./Apr. 1994) pp. 666–671.

* cited by examiner

OXIDE BASED PHOSPHORS AND PROCESSES THEREFOR

RELATED PATENT APPLICATIONS

This application is related to the following U.S. Provisional Patent Applications of Michael D. Potter: Ser. No. 60/025,550 titled "New Phosphor and Synthesis" filed Sep. 3, 1996; Ser. No. 60/025,555 titled "Integrated Etch Stop and Phosphor Process" filed Sep. 3, 1996; Ser. No. 60/025,556 titled "Integrated Etch Stop and Phosphor Process for Field Emission Device Display Applications" filed Sep. 3, 1996; Ser. No. 60/032,197 titled "Integrated Etch Stop and Low Voltage Phosphor Process for Field Emission Device Display Applications" filed Dec. 2, 1996; Ser. No. 60/032,199 titled "Integrated Etch Stop and Low Voltage Phosphor Process" filed Dec. 2, 1996; and Ser. No. 60/032,201 titled "New Low Voltage Phosphor and Synthesis" filed Dec. 2, 1996. This application is a continuation-in-part of applications Ser. No. 08/901,403 (now U.S. Pat. No. 6,071,633), Ser. No. 08/900,915 (now U.S. Pat. No. 6,015,326), Ser. No. 08/901,505, (now U.S. Pat. No. 6,169,357) and Ser. No. 08/901,701 (now U.S. Pat. No. 5,965,192), all filed on Jul. 28, 1997, and it claims the benefit of those applications. This application is also related to application Ser. No. 09/261,793, filed on Mar. 3, 1999 and application Ser. No. 09/361,423, filed on Jul. 27, 1999.

FIELD OF THE INVENTION

This invention relates generally to phosphors and more particularly to new oxide-based phosphors particularly useful as cathodoluminescent phosphors excited by low-energy electrons, and processes for preparing the new phosphors, including processes for preparing the phosphors in situ while fabricating a display, such as an electron field emission device display (FED) or a vacuum fluorescent display (VFD).

BACKGROUND OF THE INVENTION

A phosphor emitting light in response to stimulation is useful in many technical fields, including fluorescent lights, electron field-emission device displays (FED), and vacuum fluorescent displays (VFD). A phosphor responsive to excitation by electrons of low energy (i.e. accelerated by a low voltage) is particularly useful, and there are particular needs for a blue-light-emitting phosphor of high spectral purity. The hue of light emission from a phosphor is often described in terms of a wavelength or range of wavelengths of emitted light, such as the wavelength of a major or dominant peak in the phosphor's emission spectrum, or by coordinates (x and y) in a CIE (Commission Internationale d'Éclairage) chromaticity diagram. Blue light is conventionally characterized in the wavelength sense by a spectrum with a dominant peak between about 380 nanometers and about 480 nanometers, e.g. around 430 nanometers (nm). Chromaticity x and y values in the region of the CIE 1931 chromaticity diagram corresponding to blue hues are in a region about x=0.15, y=0.1. Representative blue primaries in various standards for RGB display systems correspond to similar CIE 1931 chromaticity x and y values: for example, CIE spectrum primary blue x=0.167, y=0.009; NTSC standard primary blue x=0.140, y=0.080; and graphics-monitor primary blue x=0.150, y=0.070.

There is a long-standing and continuing need for phosphors emitting in the blue region of the spectrum with high spectral purity. Phosphors such as ZnO:Zn, ZnS:Au, CdWO$_4$, and Zn$_2$WO$_5$ (each having blue-green peak light emission) and ZnGa$_2$O$_4$, ZnS:Zn, and ZnS:Ag (each having generally blue peak light emission) have been known in the art for many years. (See, for example, the article by H. W. Leverenz, "Phosphors Versus the Periodic System of the Elements" Proc. I.R.E. [May 1944] pp. 256–263.) U.S. Pat. No. 4,275,333 to Kagami et al. describes fluorescent compositions and low-velocity-electron excited fluorescent display devices, utilizing phosphors which include blue-light-emitting phosphors. U.S. Pat. Nos. 5,120,619 and 5,250,366 to Nakajima et al. describe rare earth tantalate and/or niobate phosphors which emit light under X-ray excitation, with peak light emission generally below 370 nm, and typically between about 320 nm and 350 nm. U.S. Pat. No. 5,138,171 to Tecotzky et al. describes a photostimulable X-ray energy absorbing halosilicate, halogermanate, or halo(silicate-germanate) phosphor having prompt light emission with a peak wavelength around 445 nm. U.S. Pat. No. 5,478,499 to Satoh et al. describes a low-velocity electron excited phosphor of blue luminous color having CIE 1931 chromaticity diagram y values of 0.05 to 0.25. U.S. Pat. No. 5,507,976 to Bringley et al. describes stabilized phosphor intermediates and storage phosphors capable of storing latent X-ray images for later release. At least some of the storage phosphors taught by the Bringley et al. patent are the products of firing combinations ("stabilized intermediates") including oxides with oxosulfur reducing agent for molecular iodine. U.S. Pat. No. 5,549,843 to Smith et al. discloses annealed alkaline earth metal fluorohalide storage phosphors including metal oxides. U.S. Pat. No. 5,571,451 to Srivastiva et al. describes a quantum-splitting oxide phosphor doped with Pr$^{3+}$, which has an emission spectrum having a peak emission at 400 nm when excited by vacuum ultraviolet radiation.

Many phosphors have been developed with pigments incorporated into, attached, or coated on phosphors to modify the light emitted by the underlying phosphor in order to achieve a desired hue or a desired color temperature. For example, U.S. Pat. No. 4,152,483 describes a pigment coated phosphor and process for manufacturing it; U.S. Pat. No. 4,699,662 to Nakada et al. describes a blue pigmented phosphor; U.S. Pat. No. 5,077,088 to Jeong describes a process for preparation of a pigment-coated phosphor; and U.S. Pat. No. 5,363,012 describes a pigment-attached blue-emitting phosphor.

U.S. Pat. No. 5,455,489 to Bhargava describes displays comprising doped nanocrystal phosphors which comprise separated particles of a host compound activated by a dopant, the phosphor particles being of the order of 100 angstroms in size and exhibiting quantum-confined properties. Examples of such doped nanocrystal phosphors include ZnS:Mn$^{2+}$ (yellow) and ZnS:Tb$^{3+}$ (green), and II–VI host phosphors doped with Thulium (Tm), Terbium (Tb), and Europium (Eu) for blue, green, and red light emission respectively.

In an article by Roger T. Williams, Steven R. Evatt, James D. Legg, and Mark H. Weichold "Blue light emission observed in a monolithic thin film edge emission vacuum microelectronic device" Journal of Vacuum Science and Technology B, V. 13, No. 2 (March/April 1995), p. 500 ff, light emission at about 488 nanometers wavelength was reported from a multi-layer phosphor structure (Al, ZnO, and W) under forward bias conditions.

Many of the phosphors known in the art are conventionally prepared by methods including grinding the phosphor composition and/or its precursors to a powder having a particle size distribution suitable for a particular purpose. For example, phosphors prepared for X-ray storage panels may have a median particle size of about 0.5 to 40 micrometers. U.S. Pat. No. 5,536,383 to Tran Van et al. teaches the use of a non-aqueous suspension for the deposition of luminescent materials, particularly phosphors, by electrophoresis. Phosphor powder particles in the suspension have the finest possible grain size, e.g. approximately 1 to 10 micrometers. In a field-emission-excited cathodoluminescence display structure taught by Tran Van et al. the phosphor is deposited by electrophoresis onto a transparent, conductive coating, e.g. of indium and tin oxide (ITO), on a transparent insulating substrate. U.S. Pat. No. 5,601,751 to Watkins et al. discloses a manufacturing process for high-purity phosphors of small average particle size, exhibiting sufficient luminescent efficiency for utility in field emission displays. In the process of Watkins et al., a precursor mixture including a host lattice material and a dopant starting material is milled to obtain a sized precursor mixture having an average precursor particle size less than about 1 micrometer. Particle size growth during subsequent heating for infiltration of the dopant into the host lattice structure is held to a minimum, e.g. less than about 100% or preferably less than about 50%.

Phosphors intended to be used in vacuum fluorescent displays or display devices of the cold-cathode field-emission type should not contain substances that can contaminate the cathode, causing deterioration of electron emission. Thus phosphors containing sulfur (S), cadmium (Cd), or cesium (Cs), for example have not found favor for such applications, as those elements can cause contamination in the displays. U.S. Pat. No. 5,619,098 to Toki et al. discloses a phosphor free of S and Cd, made from compounds of titanium (Ti), alkaline earth metal, and an element of group 13 of the periodic table.

Notations and Nomenclature

The term "phosphor" is used throughout this specification and the appended claims in its conventional meaning, to mean a substance capable of luminescence when suitably excited by an energy source (e.g. electromagnetic waves, electrons, or an electric field). The electromagnetic radiation emitted may consist of photons having wavelengths in the visible spectral range. Stimuli suitable for stimulating the emissions of a phosphor include, but are not limited to: electron bombardment (stimulating cathodoluminescence), other incident photons (stimulating photoluminescence or fluorescence), specifically x-ray photons (stimulating x-ray luminescence), and electric fields (stimulating electroluminescence). The term "dopant" is used herein to mean a substance incorporated in a phosphor as an activator or luminescent center, either substitutionally or interstitially with respect to the crystal lattice of the host substance, or even adsorbed on a surface of the crystal lattice of the host substance. Such dopants are conventionally denoted by their chemical symbols appended to the chemical formula for the host substance after a colon, e.g. ZnO:Zn, a zinc oxide phosphor doped with excess zinc. The term "dopant" can also include co-activators used, for example, to facilitate charge transfer. "Annealing" as used herein means heating for an effective time and temperature for a particular purpose, e.g. to effect a chemical reaction, to allow a desired degree of diffusion, etc. The abbreviation "TZO" is sometimes used herein to represent $Ta_2Zn_3O_8$.

OBJECTS AND ADVANTAGES OF THE INVENTION

More specific objects include phosphors having dominant wavelengths or peak wavelength of emission between 380 nanometers and 450 nanometers (preferably about 400 nanometers) and having CIE 1931 chromaticity coordinates x and y, where x is between about 0.14 and 0.20 and y is between about 0.05 and 0.15 (preferably about x=0.16 and about y=0.08), or phosphors having CIE 1976 chromaticity coordinates of about u'=0.18 and about v'=0.19. Another object is a blue-light-emitting phosphor which has a relatively narrow bandwidth of light emission. Other objects include phosphors which combine these properties with short persistence and high luminous efficiency. Yet another object is a blue-light-emitting phosphor that does not require addition of a pigment or a pigmented coating to achieve a desirable hue. A practical object is a phosphor that is useful in displays of several types and in blue or multi-color light sources. An important object is a cathodoluminescent phosphor stimulable by electrons of very low energy. Related objects include processes for preparing such a phosphor and processes for fabricating display devices utilizing such a phosphor. A more specific object is a process for preparing such a phosphor in situ while fabricating display devices. An even more specific object is a fabrication process in which synthesis of a phosphor is integrated with provision of an etch stop for forming an opening of a desired depth. Another specific object is a fabrication process for forming a thin region of blue-light-emitting phosphor at the surface of an anode in a display device operable using cathodoluminescence excited by electrons of very low energy. A related object is a blue-light-emitting phosphor that may be prepared as an electrically conductive composition. Yet another object is a new use for tantalum zinc oxide, $Ta_2Zn_3O_8$. Further objects include phosphors of various dominant wavelengths, prepared by methods similar to the methods disclosed for blue phosphors, and processes adapted for manufacturing such phosphors. In this respect, particular objects include red- and green-light-emitting phosphors compatible with processing of a blue-light-emitting phosphor, and the corresponding processes for making them. Other objects are processes for converting commercially available green-light-emitting phosphors to a blue-light-emitting phosphor. Particular further objects are displays (especially electron field-emission displays) comprising a number of cells formed with display devices, each display device including a phosphor having the desirable properties mentioned above, and processes for fabricating such displays.

SUMMARY OF THE INVENTION

Blue-light-emitting phosphors of this invention are based on metal oxides treated in various processes with refractory metals to prepare phosphor compositions having improved performance as cathodoluminescent phosphors stimulable by electrons of very low energy. In preferred embodiments, the phosphors are prepared in situ in an electrically-conductive thin-film or surface-layer form during fabrication of displays. Examples of the processes disclosed use metal oxides or mixed-metal oxides of zinc Zn, copper Cu, tin Sn, or indium In heated in the presence of a refractory metal such as titanium Ti, zirconium Zr, hafnium Hf, vanadium V, niobium Nb, tantalum Ta, chromium Cr, molybdenum Mo, tungsten W, or combinations or alloys or oxides thereof to make phosphors of various chromaticities. Phosphors made in accordance with the invention may also include dopants, such as manganese, chromium, a lanthanide rare earth element, or stoichiometrically excess zinc, copper, tin, or indium. A preferred process integrates an etch stop with the in situ phosphor process. The etch stop precisely defines the depth of an opening in a field-emission display cell structure utilizing the low-energy-electron excited blue-light-emitting phosphor.

The simplest process for making a phosphor in accordance with the invention is to add a quantity of tantalum pentoxide ($Ta_2O_5$) to a quantity of zinc oxide (ZnO) and to heat or "fire" the combination at an effective temperature and time to react at least a portion of each of the $Ta_2O_5$ and ZnO to form $Ta_2Zn_3O_8$, which can then be used in various forms as a blue-light-emitting phosphor. Processes for preparing phosphors in powder form, solid form for use as a sputtering target, and thin film forms are described in detail hereinbelow. Optionally, the dopants mentioned above may be used singly or in combination with each other or with other co-activators to modify the chromaticity of the phosphor in any of its powder, solid, or thin-film forms.

DETAILED DESCRIPTION OF THE PREFERRED EMBODIMENTS

Figure 1:
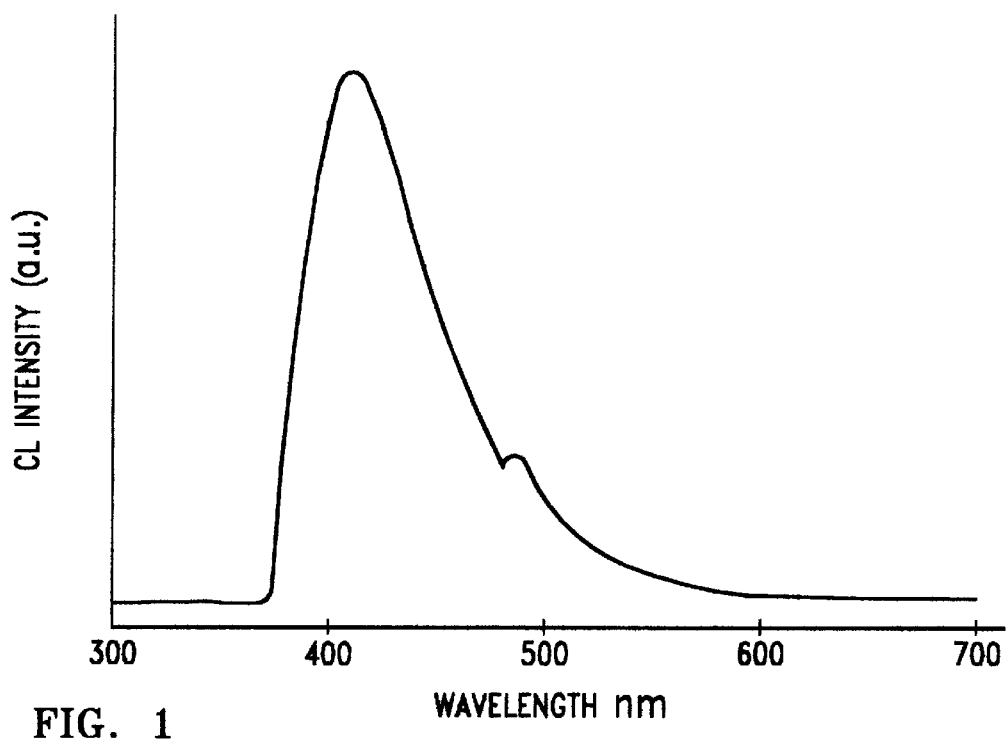
FIG. 1 is a graph of spectral emission measured from a phosphor made in accordance with a preferred embodiment of the invention.

In the following detailed description, reference is made to the several drawings, in which corresponding structural elements are denoted by the same reference numerals, and process steps are denoted by references such as S1, S2, . . . , etc. Numerical order relationships of process step references do not necessarily imply a time sequence in which steps must be performed. Thus step S1 of Example 1 described below, and step S20 of Example 4 described below are substantially equivalent, and each is the first step of the respective process example.

The phosphor of this invention, in its most preferred embodiment, is comprised essentially of zinc, tantalum, and oxygen. It is preferably made as a thin film phosphor, but alternatively may be made in a powder form or other forms. Other refractory metals, such as but not limited to Ti, Zr, Hf, V, Nb, Cr, Mo, W, or combinations or alloys thereof, can be used in place of or in addition to tantalum. It has been discovered unexpectedly that other metal oxides, such as tin oxide, indium-tin oxide, and copper oxide, may be used instead of zinc oxide in similar preparation techniques to produce additional new phosphors having generally similar desirable properties, and furthermore the dominant wavelengths of their light emissions may vary with composition. The phosphors made using tin oxide, indium-tin oxide, or copper oxide are not simply Sn-activated, In-activated, or Cu-activated phosphors, in which tin (or indium or indium-tin or copper) is an additive introduced in minor amounts as an activator of a host phosphor, but instead these phosphors contain substantial amounts of tin (or indium or indium-tin or copper).

The phosphor material may also include dopants such as manganese and/or chromium and/or lanthanide elements and/or stoichiometrically excess zinc, tin, indium, or copper. In thin-film form, these new phosphors have not shown any evidence of charging at any voltage and therefore are especially suitable for low excitation voltages such as those needed for electron field emission device displays (FED) or vacuum fluorescent displays (VFD). Observations (with a dark-adapted, unaided human eye) of a phosphor made in accordance with the invention have shown an excitation threshold voltage of less than 10 volts with a current density of about 10 $\mu A/cm^2$. However, such a visual observation does not establish a physical limitation of the phosphor. Sensitive measurements using equipment such as photomultiplier tubes may be used to determine a more accurate low excitation voltage threshold for a particular embodiment of the phosphor.

The cathodoluminescent spectral response of the new phosphor preferred base material has a dominant peak near 400 nanometers, and a minor peak at somewhat longer wavelengths. FIG. 1 shows the shape of an emission peak measured for one embodiment of the phosphor. In FIG. 1, the peak cathodoluminescent emission occurs at a wavelength of about 400 nanometers. Effects of the various preparation processes and treatments are described in more detail hereinbelow.

Figure 2:
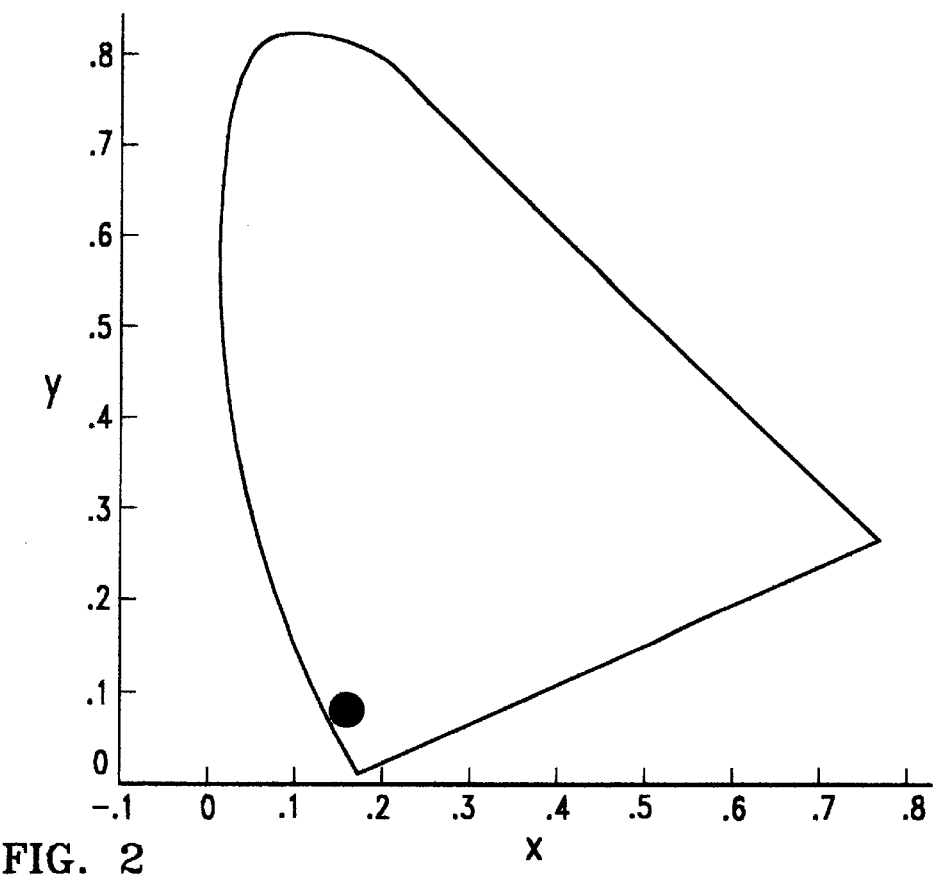
FIG. 2 is a CIE 1931 chromaticity diagram showing the chromaticity of cathodoluminescence from a blue-light-emitting phosphor made in accordance with a preferred embodiment of the invention.
Figure 3:
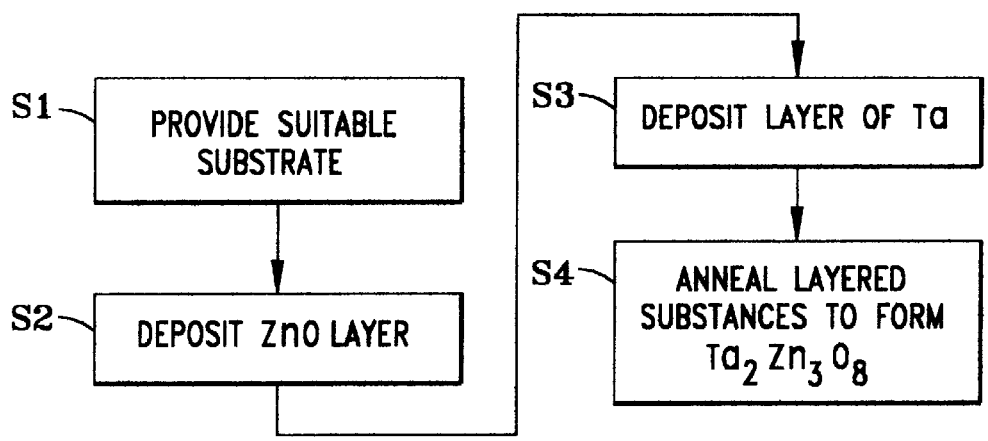
FIG. 3 is a flow chart illustrating a preferred process for preparing a preferred embodiment phosphor.

FIG. 2 is a CIE 1931 chromaticity diagram showing the chromaticity of cathodoluminescence from a phosphor made in accordance with a preferred embodiment of the invention. This phosphor has CIE 1931 chromaticity coordinates of about x=0.16 and about y=0.08, equivalent to CIE 1976 chromaticity coordinates of about u'=0.18 and about v'=0.19.

The new phosphor material can be prepared in a number of ways. For example, starting materials can be separately deposited and subsequently annealed to form the new phosphor. The starting material may be precursors of the constituents. For example, instead of starting with zinc oxide, the starting material may be a compound capable of being converted to zinc oxide by heat treatment. Starting material deposition techniques include, but are not limited to: sequential sputtering, co-sputtering, sequential evaporation, co-evaporation, molecular beam epitaxy (MBE), ion-assisted epitaxy, atomic layer epitaxy, laser ablation deposition, chemical vapor deposition (CVD), metal-organic chemical vapor deposition, electron cyclotron resonance chemical vapor deposition, and plasma-enhanced chemical vapor deposition. The invention will be further clarified by considering the following examples, which are intended to be purely exemplary of the practice of the invention. A preferred method of preparing a preferred embodiment of the phosphors is described below as Example 1. Other alternative preparation methods are described as Examples 2, 3, and 4.

EXAMPLE 1

Referring now to FIGS. 3 and 7a–7k: a suitable substrate 20 is first provided (S1). On substrate 20, a layer of zinc oxide (ZnO) 30 is deposited (S2) by sputtering, such as rf sputtering. ZnO layer 30 may be about 0.5 micrometer thick. The ZnO may have an excess of zinc, which forms the "super-stoichiometric" zinc oxide phosphor (ZnO:Zn) known in the art. The zinc oxide material deposited in this manner tends to form columnar crystallites having a c-axis orientation (perpendicular to the substrate surface). It has been found by investigation of the new phosphor described herein that such an orientation greatly reduces thin film photon refractive trapping. This is a very useful result and is highly desirable for electronic display applications.

A tantalum layer 40 is deposited (S3) on top of the zinc oxide layer 30. The tantalum can be sputtered, for example. The thickness of the tantalum layer 40 is controlled to provide an effective amount of tantalum, based on the thickness of zinc oxide deposited in step S2. If too much tantalum is used, metallic Ta may remain unreacted or concentration quenching may occur. Suitable proportions of zinc oxide and tantalum may be achieved for many applications by controlling the tantalum layer thickness to be about 10 percent of the initial thickness of the zinc oxide layer. However, for low-voltage cathodoluminescent applications (i.e. those employing low-energy electrons), the tantalum layer thickness can be much less than 10 percent of the zinc oxide layer thickness, since the cathodoluminescence is a surface phenomenon. (The low voltage electron penetration and excitation takes place very near the phosphor surface—a few tens of nanometers for electrons below 500 V). Also the spectral output can include the normal spectral output of zinc oxide if the tantalum layer is kept thin enough so that the electrons excite cathodoluminescence in both the new phosphor and the underlying zinc oxide material. A tantalum thickness of 0.25 percent of the zinc oxide thickness (e.g. 2.5 nanometers of Ta for 1 micrometer ZnO) has been successfully used. Another especially useful arrangement had a film of Ta about 7.5–10 nanometers thick on about 200 nanometers of ZnO before annealing to form the phosphor in a very thin form.

Thus one form of this invention provides a phosphor having an overall spectral output, the phosphor including a base layer formed of a first phosphor having a first spectral output, and an overlayer formed of a second phosphor and having a second spectral output, whereby the first and second spectral outputs combine to provide the overall spectral output.

An anneal (S4) of the layered materials is used to form the new phosphor material. A preferred way to anneal the zinc oxide/tantalum composite structure is to heat the composite at 1200° C. for two minutes in an inert environment, such as an atmosphere of nitrogen gas. This is commonly referred to as a "rapid thermal anneal" (RTA) or sometimes as a "rapid thermal process" (RTP). Wide ranges of effective temperatures and anneal times exist. Even a ten second anneal at 1200° C. is sufficient to substantially eliminate a green peak from the cathodoluminescence spectrum. A low temperature of 900 degrees centigrade and a high temperature of 1250° C. to about 1500° C. have been successfully used. The times used varied from 10 seconds to 6 minutes. However, these are not limitations. Other annealing techniques are also effective such as a standard thermal anneal in a furnace tube. By way of example, 1100° C. for 90 minutes has been an effective anneal. Laser annealing is another example of a suitable annealing process.

During the anneal, Ta combines with ZnO to some depth. In one sample using 1 micrometer thickness of ZnO and 30 nm of Ta and annealed at 1100° C. in an $Ar/O_2$ atmosphere, Auger electron spectroscopy profiling showed Ta present from the surface of the composite material to a depth of about ⅓ of the initial ZnO layer thickness, with a peak Ta concentration at about 150 nm below the surface. X-ray diffraction of such compositions indicate that they include both $Ta_2Zn_3O_8$ and ZnO. The $Ta_2Zn_3O_8$ is believed to be responsible for the blue luminescence observed. According to a scientific paper by Kasper "Die Koordinationsverhältnisse in Zinkniobat und -tantalat" in "Zeitschrift für anorganische und allgemeine Chemie" Vol. 355, No. 1—1, pp. 1–11 (November 1967), another possible phase with lower molar ratios of $Ta_2O_5$ to ZnO is the phase $Ta_2ZnO_6$. This phase was not observed in the X-ray diffraction patterns mentioned above. It will be apparent to those skilled in the art that zinc oxide is an example of a preferred material and that (such as tin oxide, indium oxide, indium-tin oxide, or cupric oxide) other oxide materials can be used as suitable host bases. Similarly, those skilled in the art will readily understand that other refractory transition metals can be used to prepare other specific new phosphor materials similar to the composition described herein.

The phosphor described herein is preferably prepared as a thin film phosphor. However, it will be evident to those skilled in the art that other forms of the new phosphor can easily be made. For example, after the phosphor material is synthesized, it can be ground to a powder of a desired particle-size distribution, such as the powder phosphors commonly used in cathode ray tubes (CRT). The powdered form can be deposited onto a desired substrate by any of the known techniques, such as settling (sedimentation), spraying, or electrophoresis.

EXAMPLE 2

Figure 5:
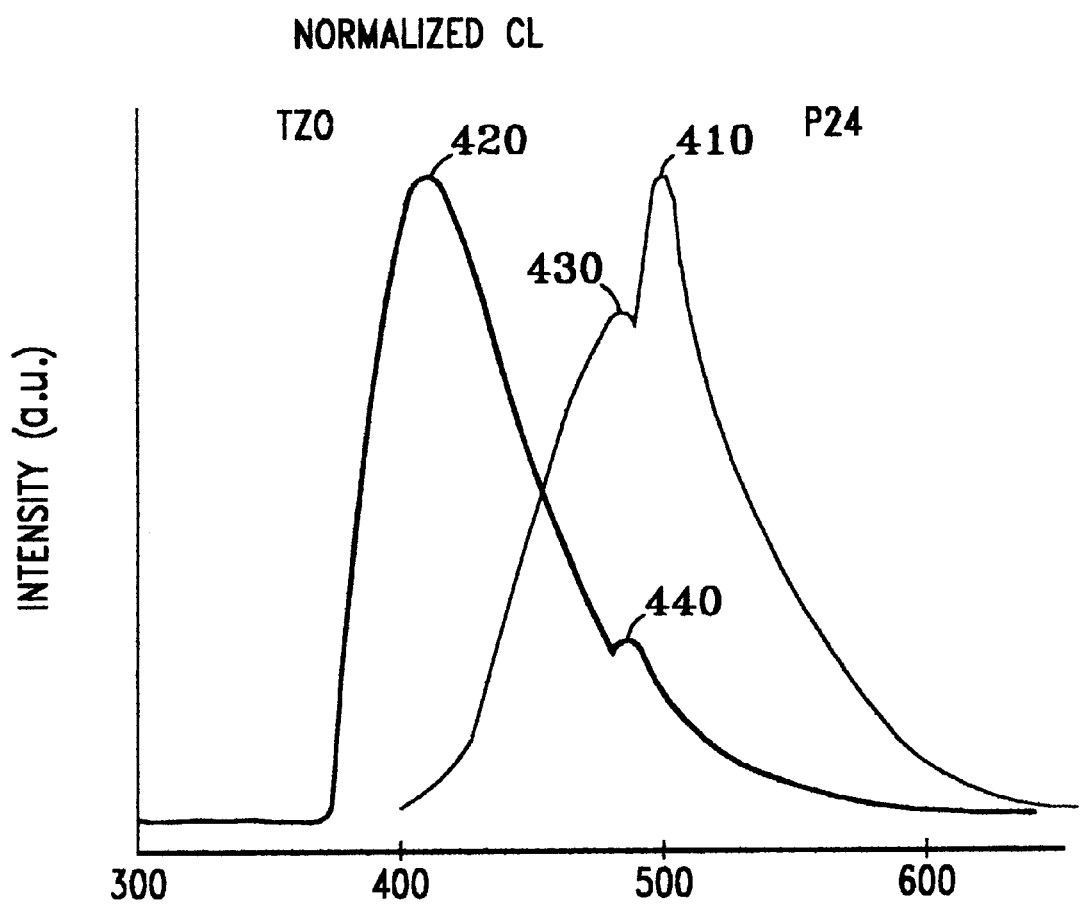
FIG. 5 is a graph of cathodoluminescent spectral emissions measured from a starting material phosphor and from a product phosphor made in accordance with the invention.

In this example, the starting materials are powders of commercially-available P24 phosphor (ZnO:Zn) and tantalum pentoxide ($Ta_2O_5$). Normalized cathodoluminescence spectra for the starting material and a phosphor product made in accordance with the present invention are shown in FIG. 5. The normal dominant cathodoluminescent emission peak 410 of P24 phosphor occurs at about 505 nm. These starting materials are mixed in suitable proportions (ignoring the excess Zn in the P24 phosphor) for the reaction:

$$3ZnO + Ta_2O_5 \rightarrow Ta_2Zn_3O_8.$$

The mixture is heated at an effective temperature (over about 900° C. and up to about 1500° C.), e.g. 1200° C. for a suitable time (e.g. 2 hours), resulting in a blue-light-emitting phosphor having a dominant peak 420 of cathodoluminescent emission at about 400 nm. A secondary (lower intensity) cathodoluminescent emission peak at about 493 nm is observed from both P24 (430) and in the $Ta_2Zn_3O_8$ phase (440).

EXAMPLE 3

Figure 4:
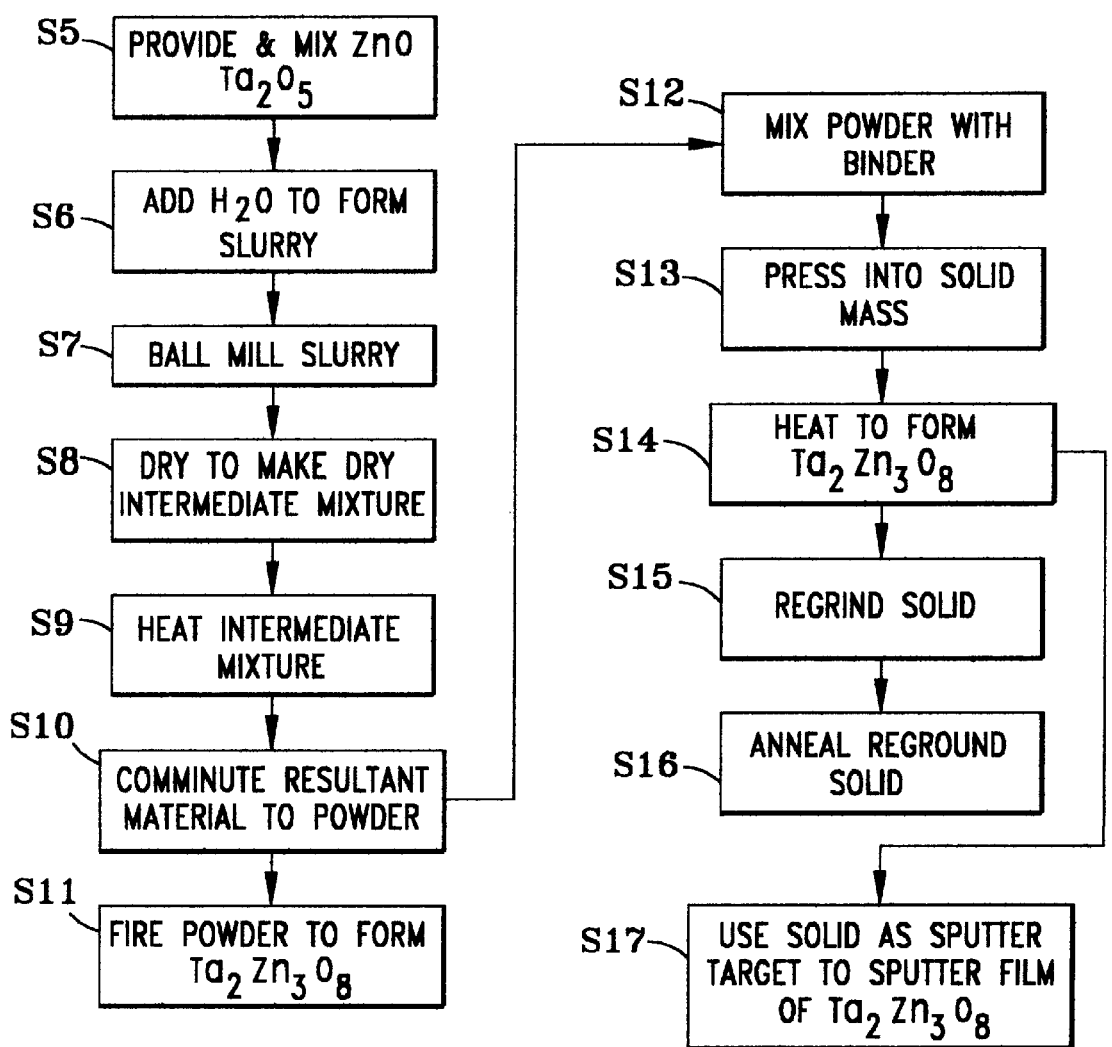
FIG. 4 is a flow chart illustrating processes for preparation of alternate forms of phosphors made in accordance with the invention.

In this example (illustrated by the flow chart of FIG. 4), the starting materials are ZnO and $Ta_2O_5$. The starting materials zinc oxide (ZnO) and tantalum pentoxide ($Ta_2O_5$) are mixed (S5) in proportions according to molecular weight for $Ta_2Zn_3O_8$ to form a mixture; water is added (S6) to the mixture to form a slurry; the slurry is ball milled (S7) and dried (S8) to provide a dry intermediate mixture; the dry intermediate mixture is heated (S9) at an effective temperature, equal to or greater than 900° C. in air or other ambient atmospheres; the resultant material is comminuted (S10) to a fine powder. The fine powder is either (1) fired (S11) at an effective temperature and time, e.g. 1200° C. or higher for about 1 hour or more, to form $Ta_2Zn_3O_8$, or (2) mixed (S12) with a binder such as polyvinyl alcohol, pressed into a solid (S13), and heated (S14) at about 1200° C. or higher for about 1 hour or more. The solid can be reground (S15) and annealed (S16) if required, or used (S17) as a sputter target, or simply used as a powder phosphor. When the solid is used as a sputter target as in step S17, the solid mass is disposed in suitable relationship to a phosphor-receiving surface and material is sputtered from that solid sputtering target onto the phosphor-receiving surface to form a phosphor comprising $Ta_2Zn_3O_8$ on the phosphor-receiving surface. Other organic polymers, such as cellulose acetate butyrate, a polyalkyl methacrylate, a polyvinyl-n-butyral, a copoly-(vinyl acetate/vinyl chloride), a copoly-(acrylonitrile/butadiene/styrene), a copoly-(vinyl chloride/vinyl acetate/vinyl alcohol), or a mixture of such organic polymers, may be used as the binder as alternatives to polyvinyl alcohol in step S12.

EXAMPLE 4

This example is an integrated fabrication technique using an etch stop that is also at the same time a component of an in situ phosphor-forming process. The etch stop material is used both to prepare the new low-voltage phosphor material and to define the depth of an opening in a display structure utilizing the phosphor. The etch stop solves the problem of over-etching that frequently occurs in the fabrication of field-emission displays. The etch stop first protects the nascent phosphor layer and subsequently is also used in preparation of the new phosphor. The etch stop layer does not need to be removed. After an anneal, at least a portion of the etch stop is incorporated into the base phosphor and modifies the composition of the base phosphor to produce the new phosphor, as described above in Example 1. Examples of applications of this integrated phosphor preparation process, performed in situ, include phosphor plates, screens, panels, and display matrices, among others.

EXAMPLE 5

Figure 9:
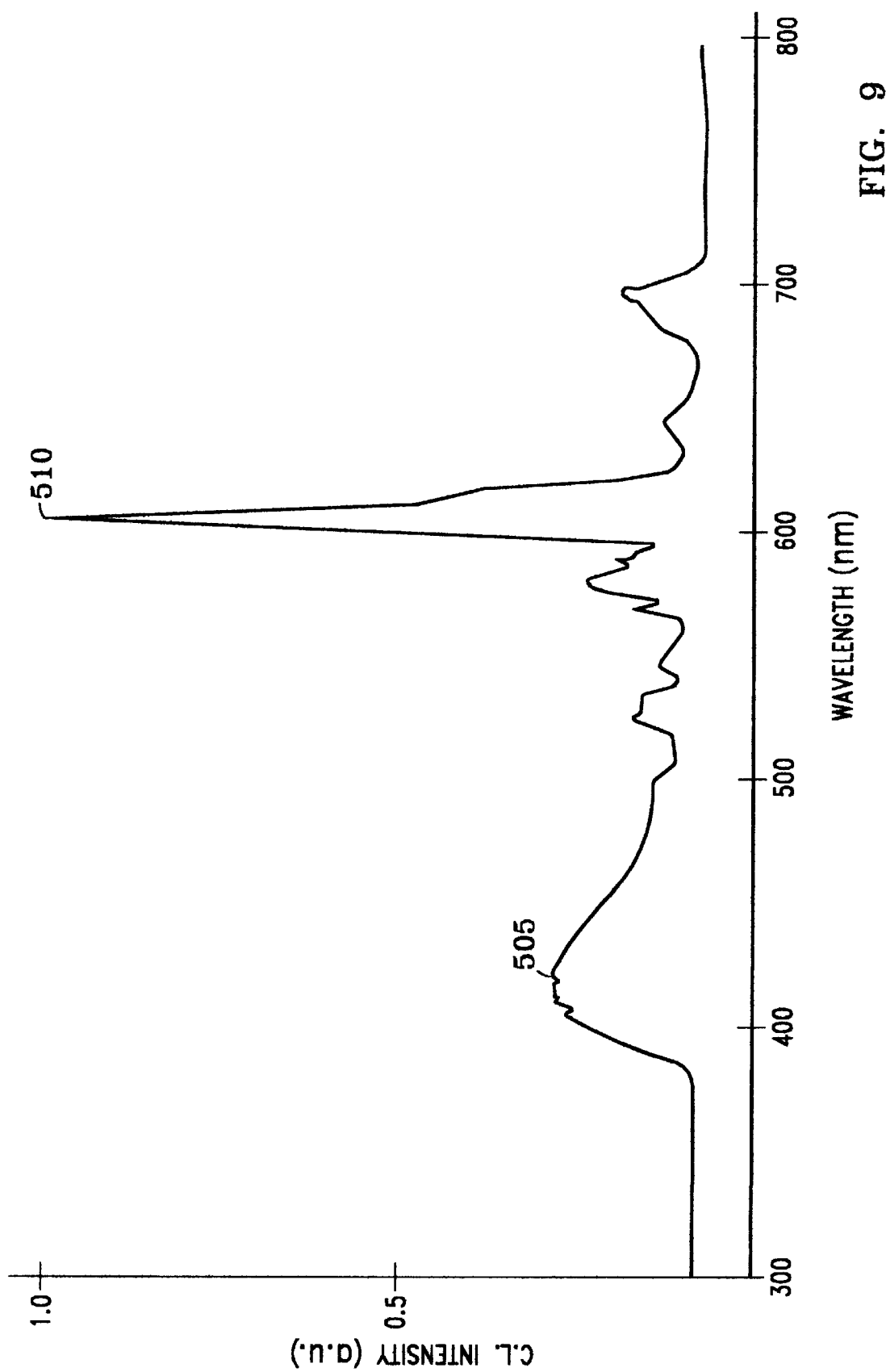
FIG. 9 is a graph of spectral emission measured from a phosphor made as in Example 5.

A phosphor was prepared by the general method of Example 1, but Example 5 included incorporation of europium into the phosphor as a dopant to alter the spectral emission. FIG. 9 is a graph of spectral emission measured from a phosphor made as in Example 5, showing a relatively minor emission peak 505 at about 420 nm in the blue region of the spectrum, and a dominant emission peak 510 at about 610 nm in the reddish orange region of the spectrum due to the doping with europium. FIG. 9, as with all the spectral emission graphs in the drawings, is normalized, so that the vertical cathodoluminescent intensity axis has arbitrary units (a.u.).

EXAMPLE 6

Figure 10:
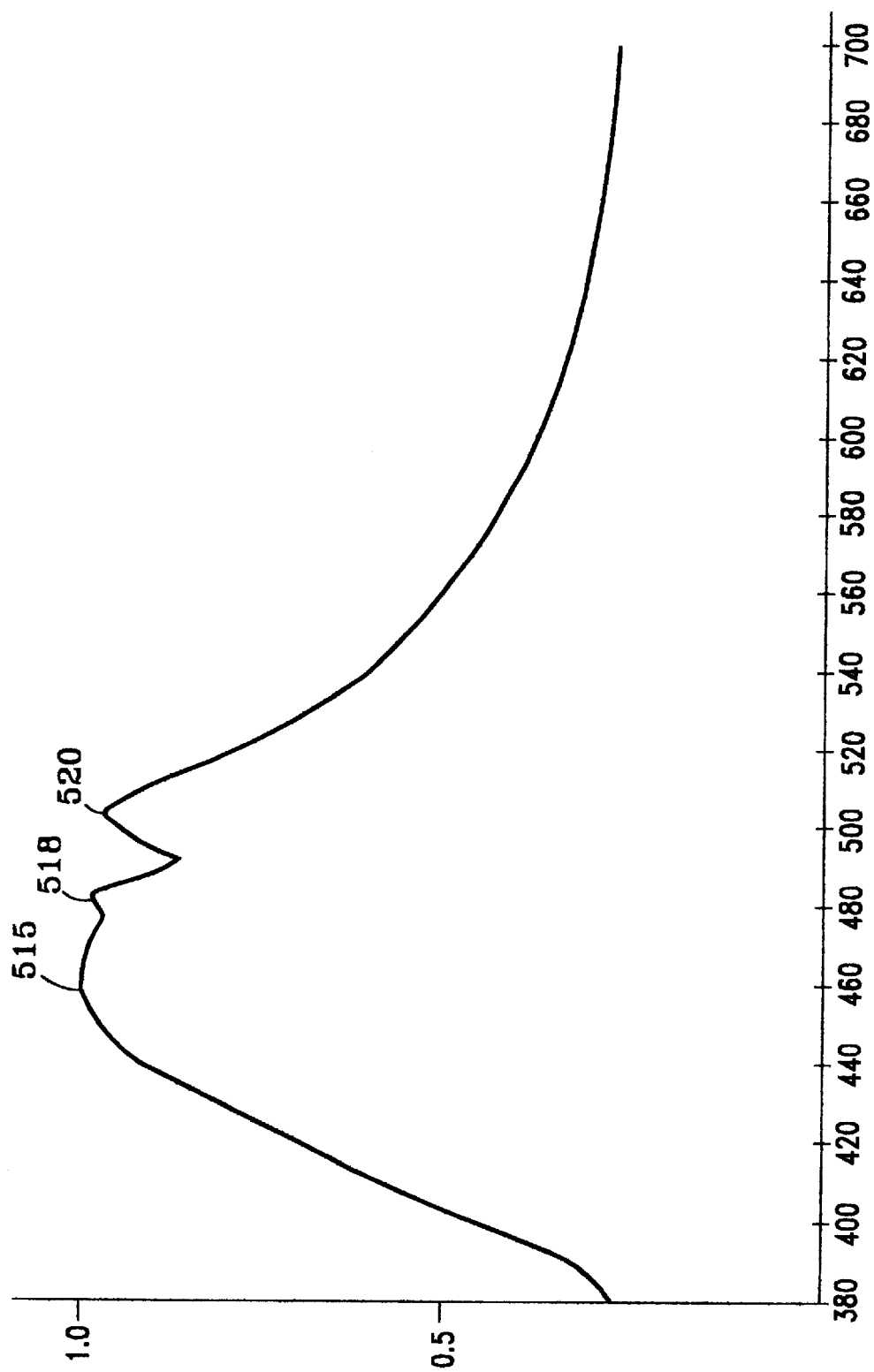
FIG. 10 is a graph of spectral emission measured from a phosphor made as in Example 6.

A phosphor was prepared by the general method of Example 3 above, mixing indium oxide powder and tantalum pentoxide powder and heating the dry intermediate mixture at 1000° C. for two hours. FIG. 10 is a graph of spectral emission measured from a phosphor made as in Example 6, showing an emission peak 515 at about 460 nm in the blue region, an emission peak 518 at about 480 nm in the blue-green region, and an emission peak 520 at about 500 nm in the green region of the spectrum.

EXAMPLE 7

Figure 11:
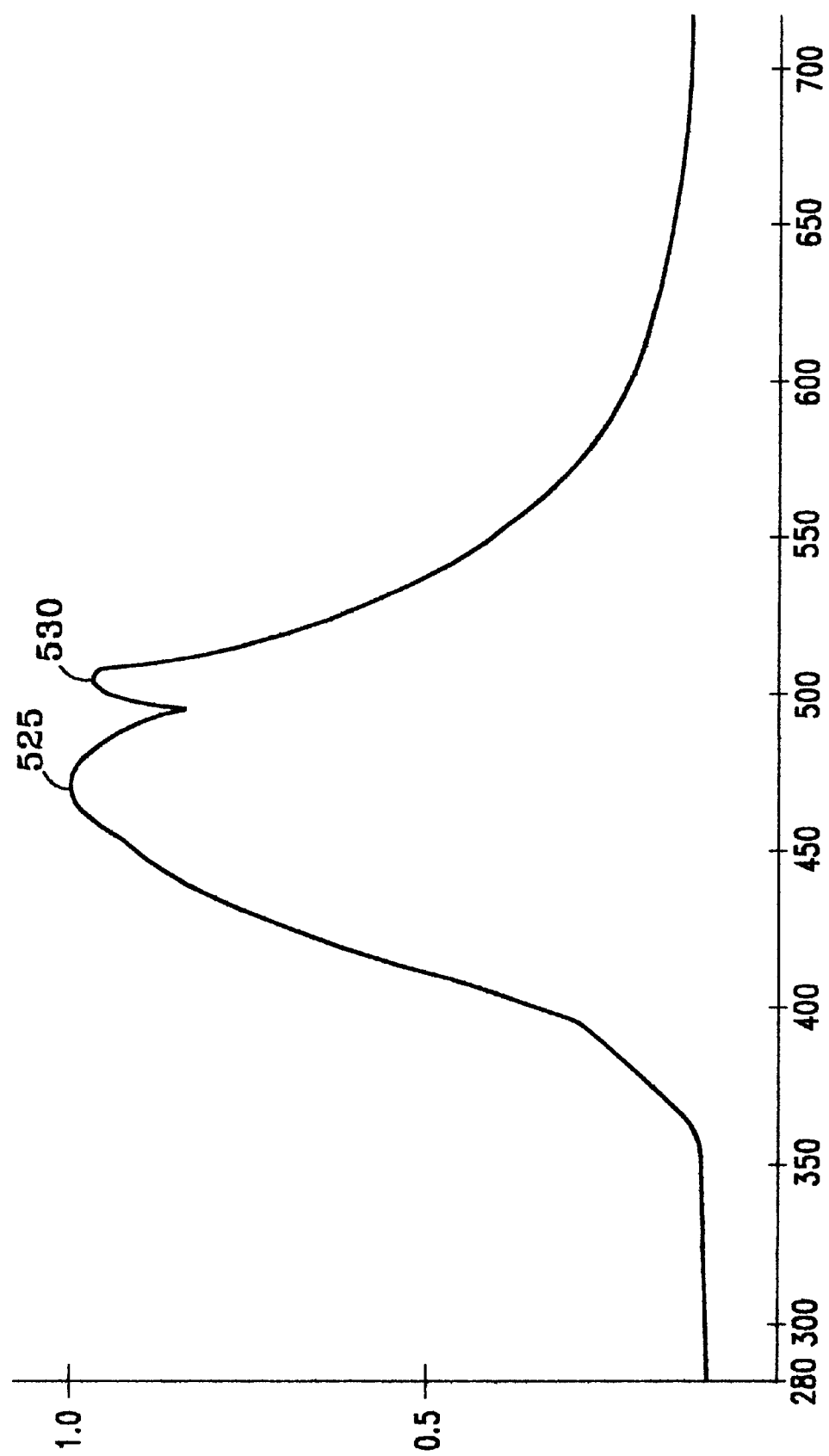
FIG. 11 is a graph of spectral emission measured from a phosphor made as in Example 7.

A phosphor was prepared by the general method of Example 3 above, mixing tungsten oxide ($WO_3$) powder and zinc oxide (ZnO) powder and heating the dry intermediate mixture at 900° C. for one hour. FIG. 11 is a graph of spectral emission measured from a phosphor made as in Example 7, showing an emission peak 525 at about 460 nm in the blue region of the spectrum, and an emission peak 530 at about 495 nm in the blue-green region of the spectrum. The CIE 1931 chromaticity coordinates of the cathodoluminescence observed from this phosphor were about x=0.174, y=0.214.

EXAMPLE 8

Figure 12:
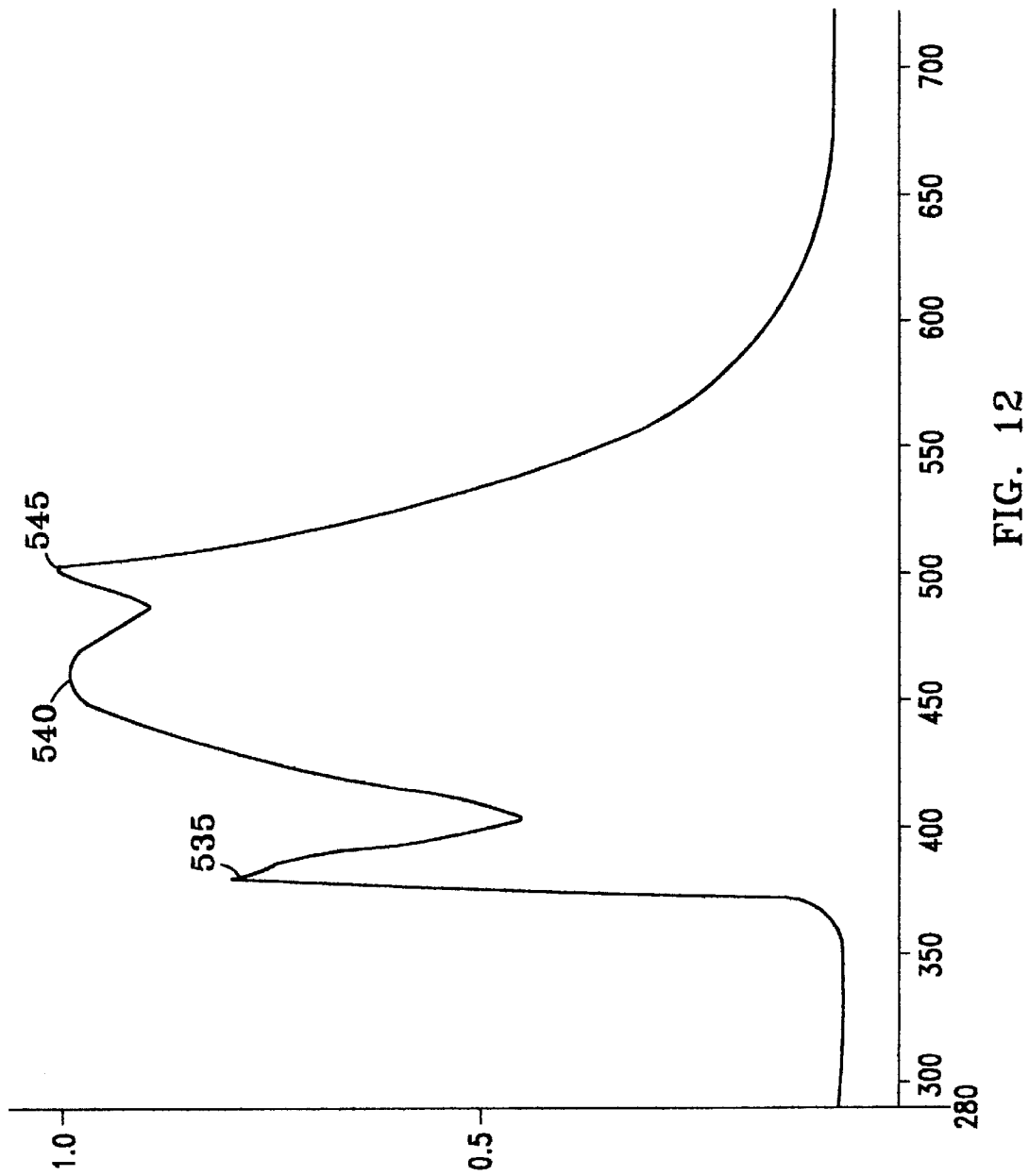
FIG. 12 is a graph of spectral emission measured from a phosphor made as in Example 8.

A phosphor was prepared by the general method of Example 3 above, mixing tungsten oxide powder and zinc oxide powder and heating the dry intermediate mixture at 925° C. for fourteen (14) hours. FIG. 12 is a graph of spectral emission measured from a phosphor made as in Example 8, showing an emission peak 535 at about 375 nm in the violet region of the spectrum (a portion of which peak may have been absorbed by a window with limited transmission in this spectral region), an emission peak 540 at about 450–460 nm in the blue region of the spectrum, and an emission peak 545 at about 495–500 nm in the blue-green region of the spectrum. The CIE 1931 chromaticity coordinates of the cathodoluminescence observed from this phosphor were about x=0.169, y=0.208.

EXAMPLE 9

Figure 13:
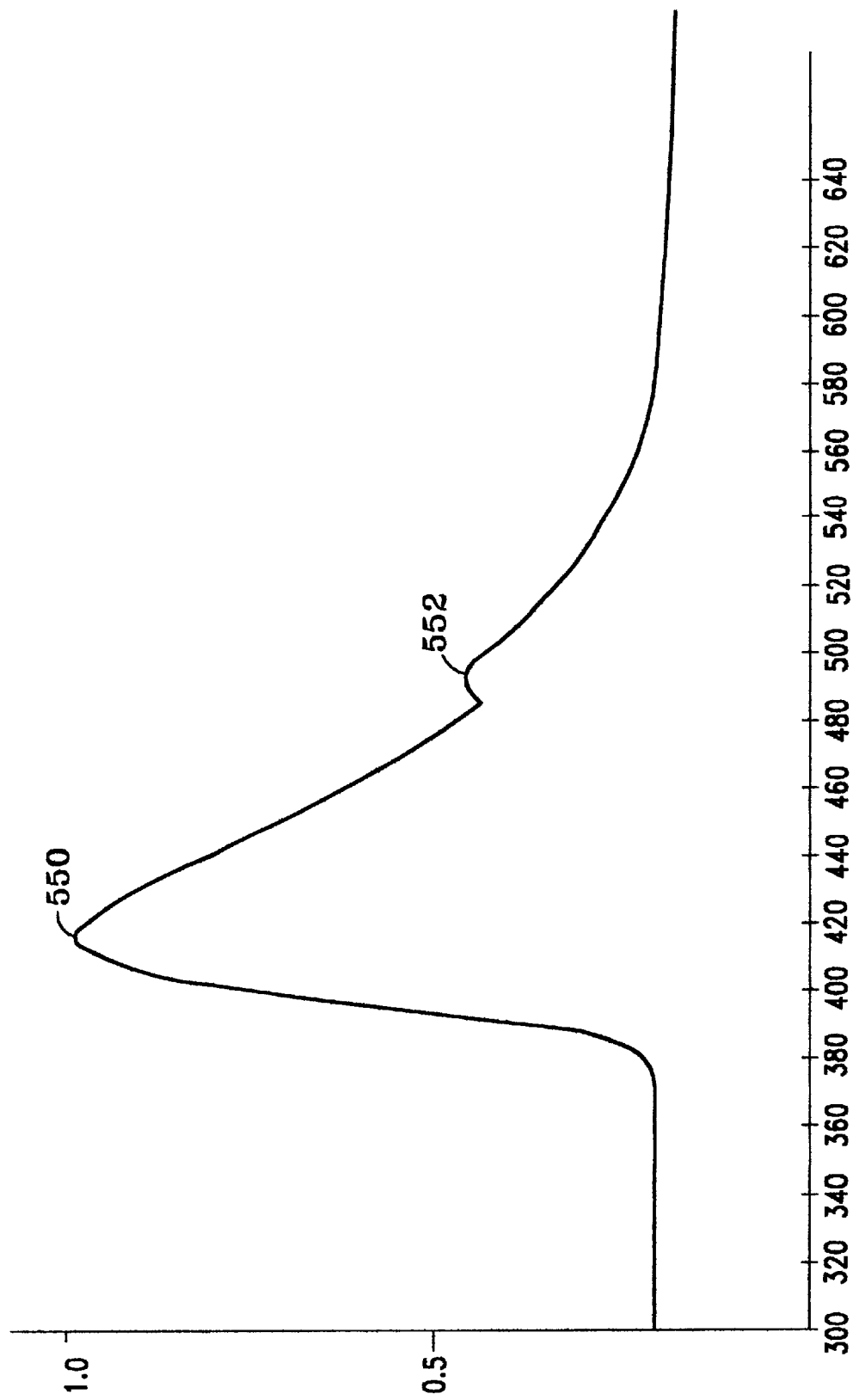
FIG. 13 is a graph of spectral emission measured from a phosphor made as in Example 9.

A phosphor was prepared by the general method of Example 1 above, depositing a thin film of tantalum over a thin film of tin oxide deposited on a flat inert substrate, and heating the combination at 1000° C. for 1 minute. FIG. 13 is a graph of spectral emission measured from a phosphor made as in Example 9, showing an emission peak 550 at about 418 nm in the blue region of the spectrum and a minor peak 552 at about 500 nm in the green region of the spectrum.

EXAMPLE 10

Figure 14:
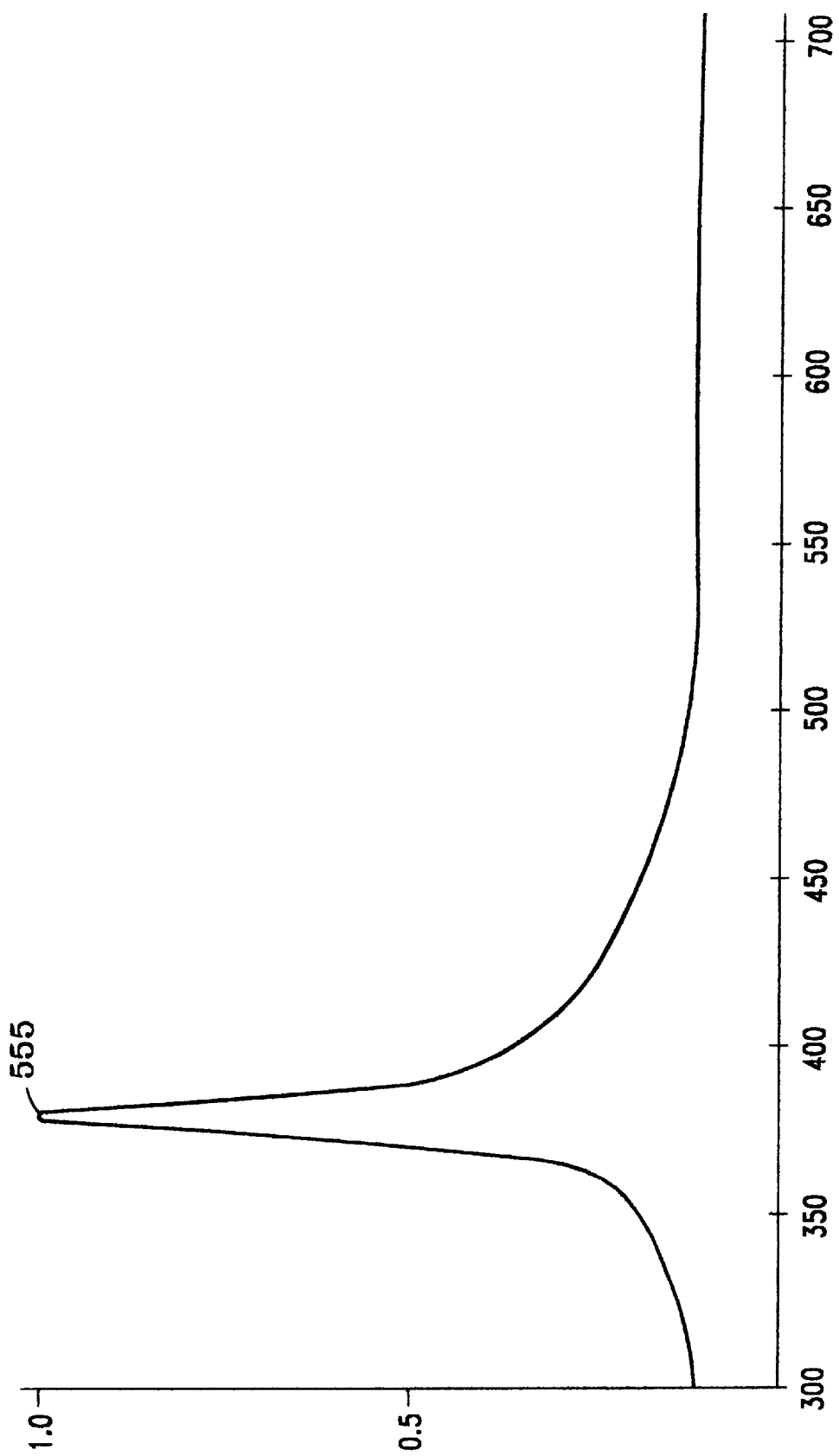
FIG. 14 is a graph of spectral emission measured from a phosphor made as in Example 10.

A phosphor was prepared by the general method of Example 1 above, sputter-depositing a thin film of tungsten over a thin film of zinc oxide sputter-deposited on a flat inert substrate, and heating the combination at 1100° C. for 1 minute. FIG. 14 is a graph of spectral emission measured from a phosphor made as in Example 10, showing an emission peak 555 at about 375 nm in the violet region of the spectrum.

EXAMPLE 11

Figure 15:
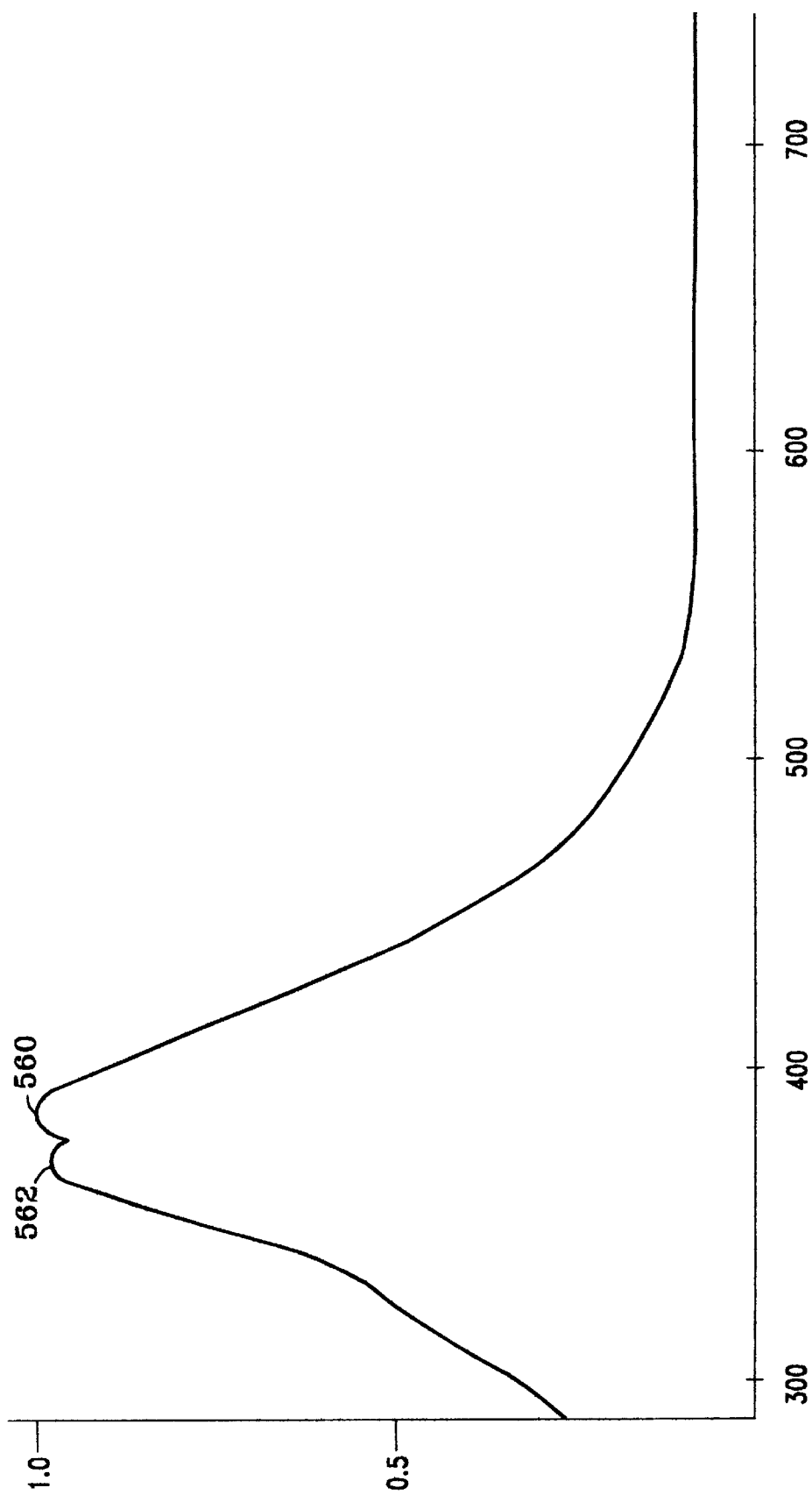
FIG. 15 is a graph of spectral emission measured from a phosphor made as in Example 11.

A phosphor was prepared by the general method of Example 1 above, sputter-depositing a thin film of molybdenum over a thin film of zinc oxide sputter-deposited on a flat inert substrate, and heating the combination at 1100° C. for 1 minute. FIG. 15 is a graph of spectral emission measured from a phosphor made as in Example 11, showing an emission peak 560 at about 380 nm in the violet region and an emission peak 562 at about 365 nm in the violet region of the spectrum.

EXAMPLE 12

Figure 16:
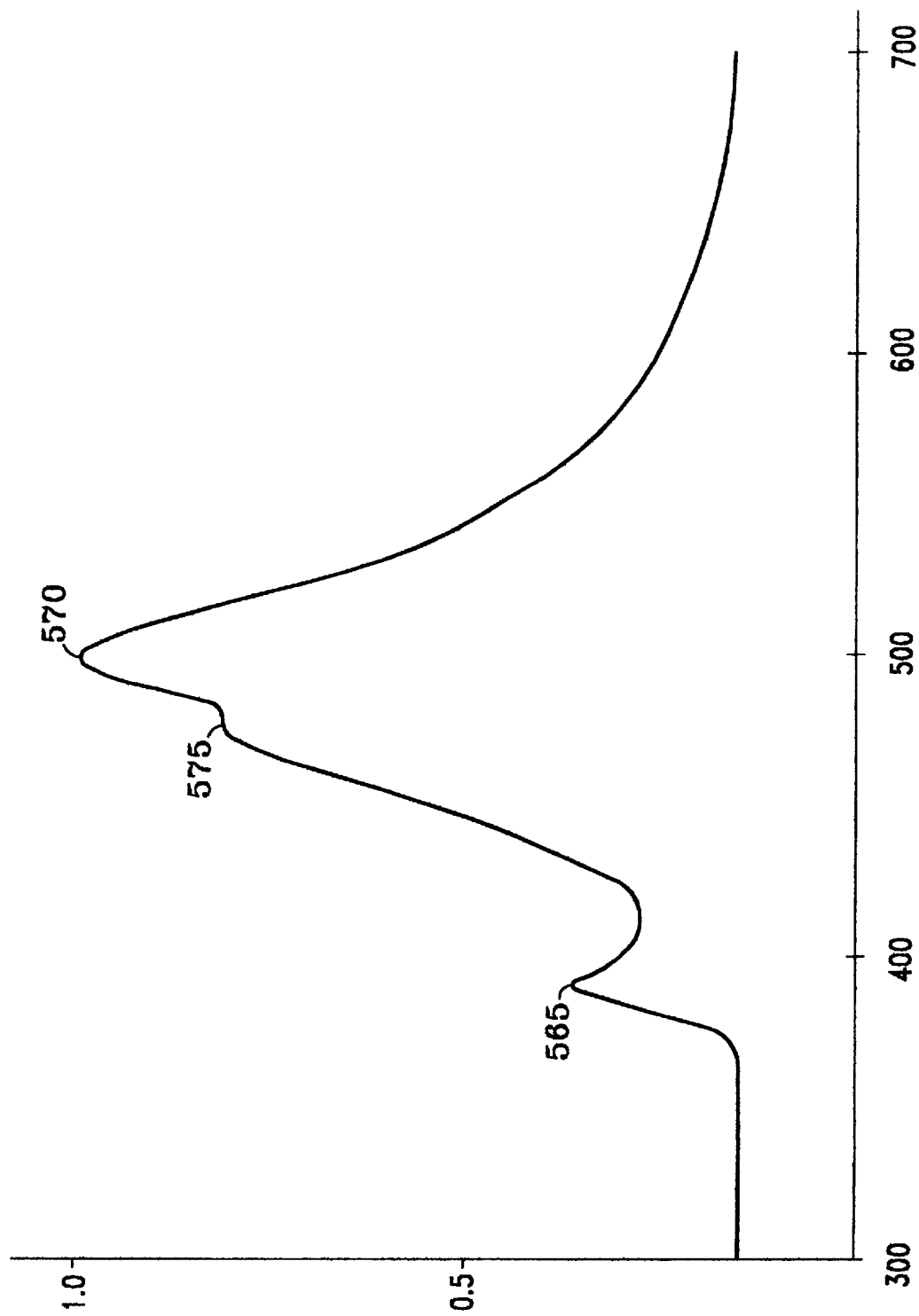
FIG. 16 is a graph of spectral emission measured from a phosphor made as in Example 12.

A phosphor was prepared by the general method of Example 1 above, depositing a thin film of niobium over a thin film of zinc oxide deposited on a flat inert substrate, and heating the combination at 1200° C. for 2 minutes. FIG. 16 is a graph of spectral emission measured from a phosphor made as in Example 12, showing a relatively minor emission peak 565 at about 395 nm in the violet region of the spectrum and a dominant emission peak 570 at about 500 nm in the green region of the spectrum. There is also an unresolved intermediate-intensity "shoulder" peak 575 it about 480 nm in the blue-green region of the spectrum.

EXAMPLE 13

Figure 17:
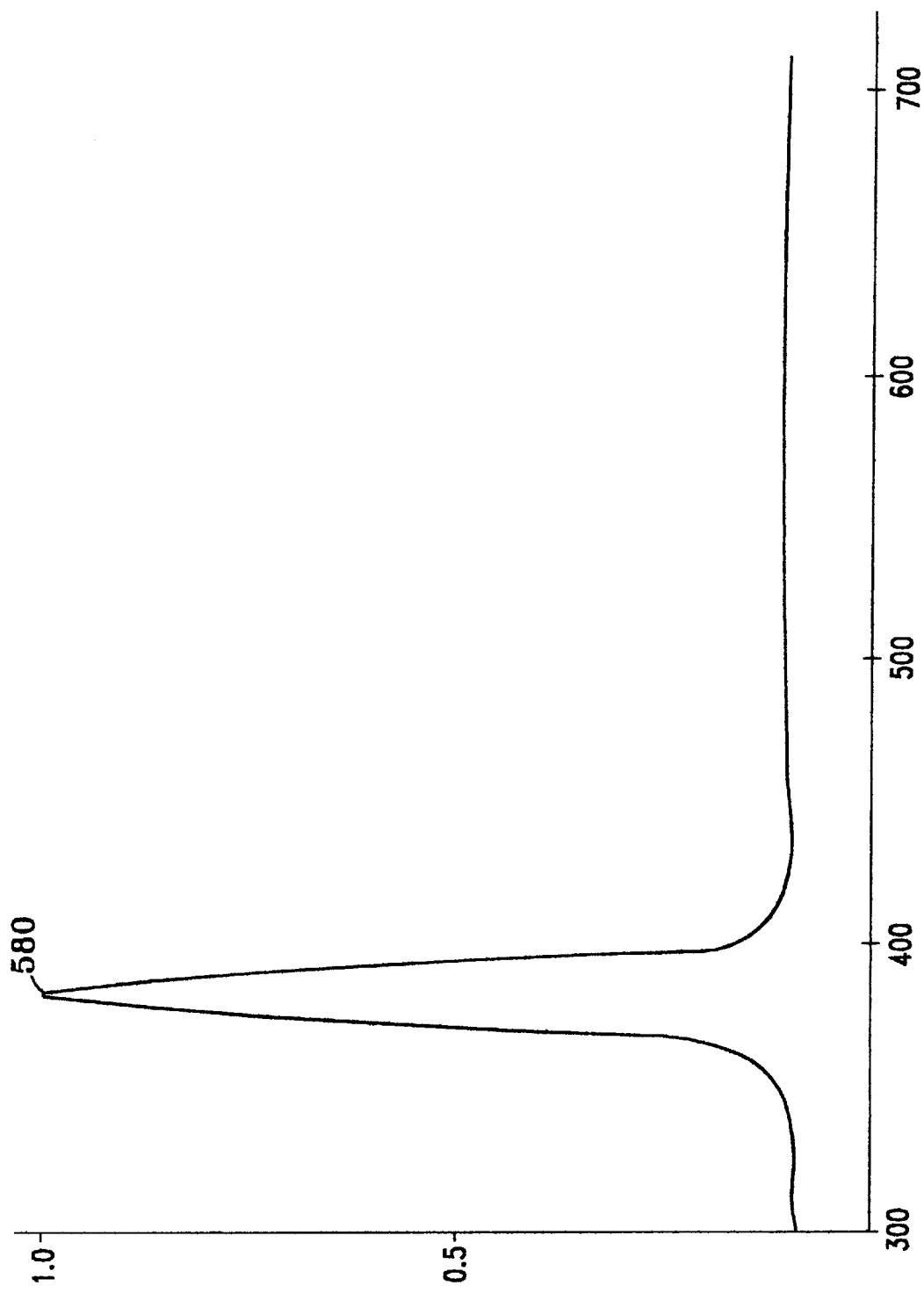
FIG. 17 is a graph of spectral emission measured from a phosphor made as in Example 13.

A phosphor was prepared by the general method of Example 1 above, depositing a thin film of vanadium over a thin film of zinc oxide deposited on a flat inert substrate, and heating the combination at 1100° C. for 1 minute. FIG. 17 is a graph of spectral emission measured from a phosphor made as in Example 13, showing an emission peak 580 at about 378 nm in the violet region of the spectrum. The CIE 1931 chromaticity coordinates of the cathodoluminescence observed from this phosphor were about x=0.173, y=0.005.

EXAMPLE 14

Figure 18:
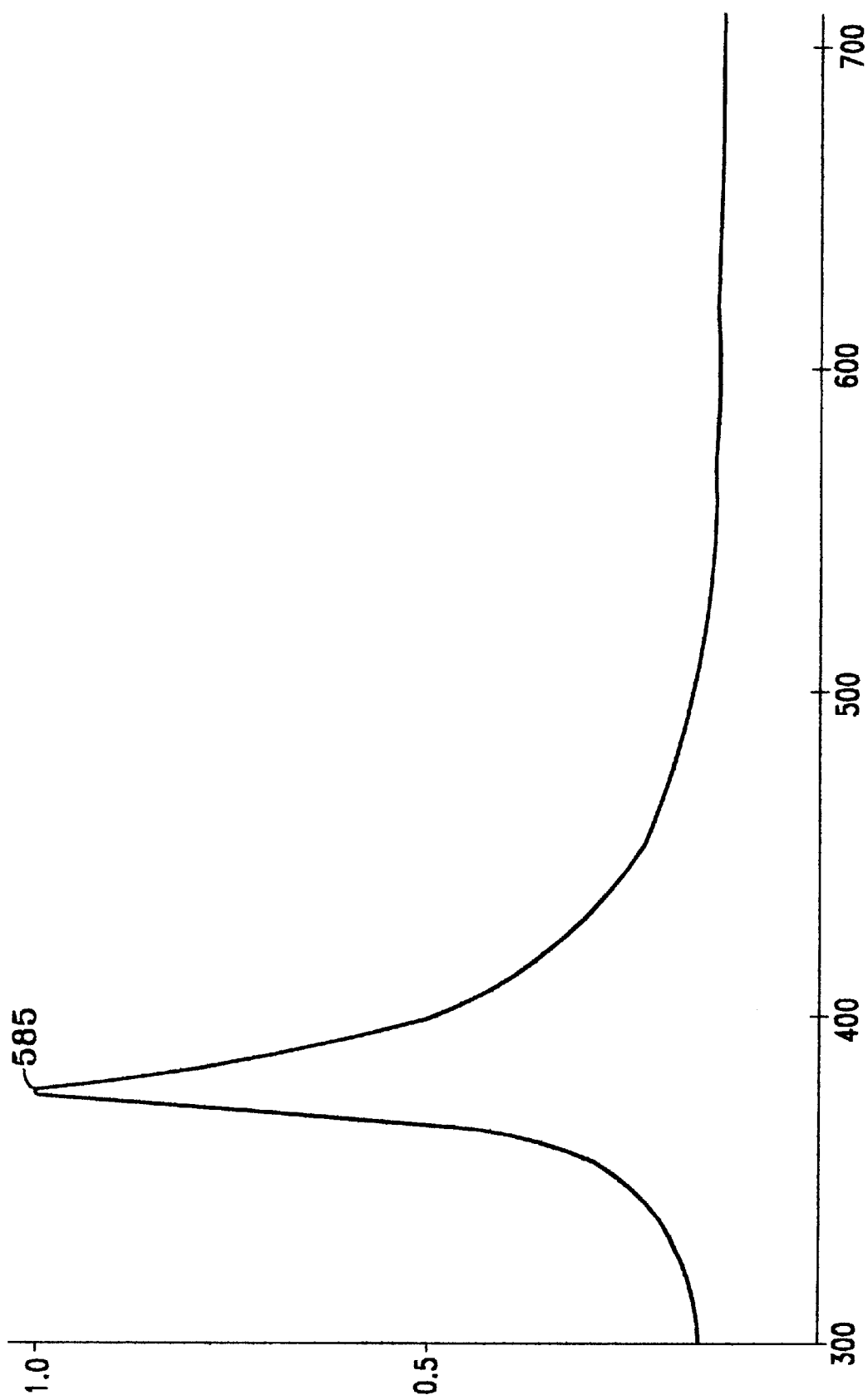
FIG. 18 is a graph of spectral emission measured from a phosphor made as in Example 14.

A phosphor was prepared by the general method of Example 1 above, depositing a thin film of titanium over a thin film of zinc oxide deposited on a flat inert substrate, and heating the combination at 1100° C. for 1 minute. FIG. 18 is a graph of spectral emission measured from a phosphor made as in Example 14, showing an emission peak 585 at about 373 nm in the violet region of the spectrum. The CIE 1931 chromaticity coordinates of the cathodoluminescence observed from this phosphor were about x=0.157, y=0.035.

EXAMPLE 15

Figure 19:
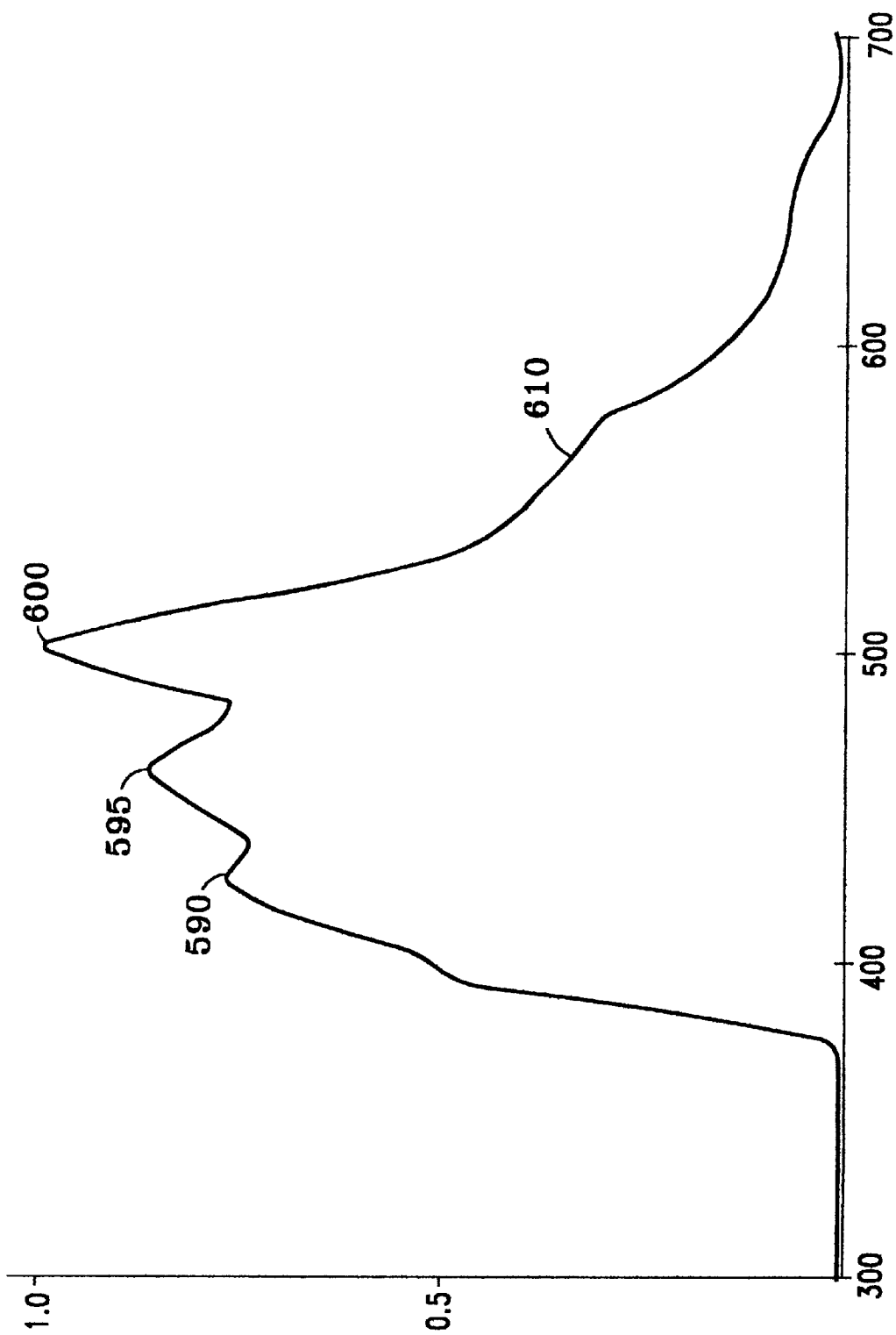
FIG. 19 is a graph of spectral emission measured from a phosphor made as in Example 15.

A phosphor was prepared by the general method of Example 1 above, depositing a thin film of zirconium over a thin film of zinc oxide deposited on a flat inert substrate, and heating the combination at 1200° C. for 2 minutes. FIG. 19 is a graph of spectral emission measured from a phosphor made as in Example 15, showing an emission peak 590 at about 425 nm in the blue region of the spectrum, an emission peak 595 at about 460 nm in the blue region of the spectrum, an emission peak 600 at about 502 nm in the green region of the spectrum, and a shoulder peak 610 at about 560 nm in the yellow-green region of the spectrum.

EXAMPLE 16

Figure 20:
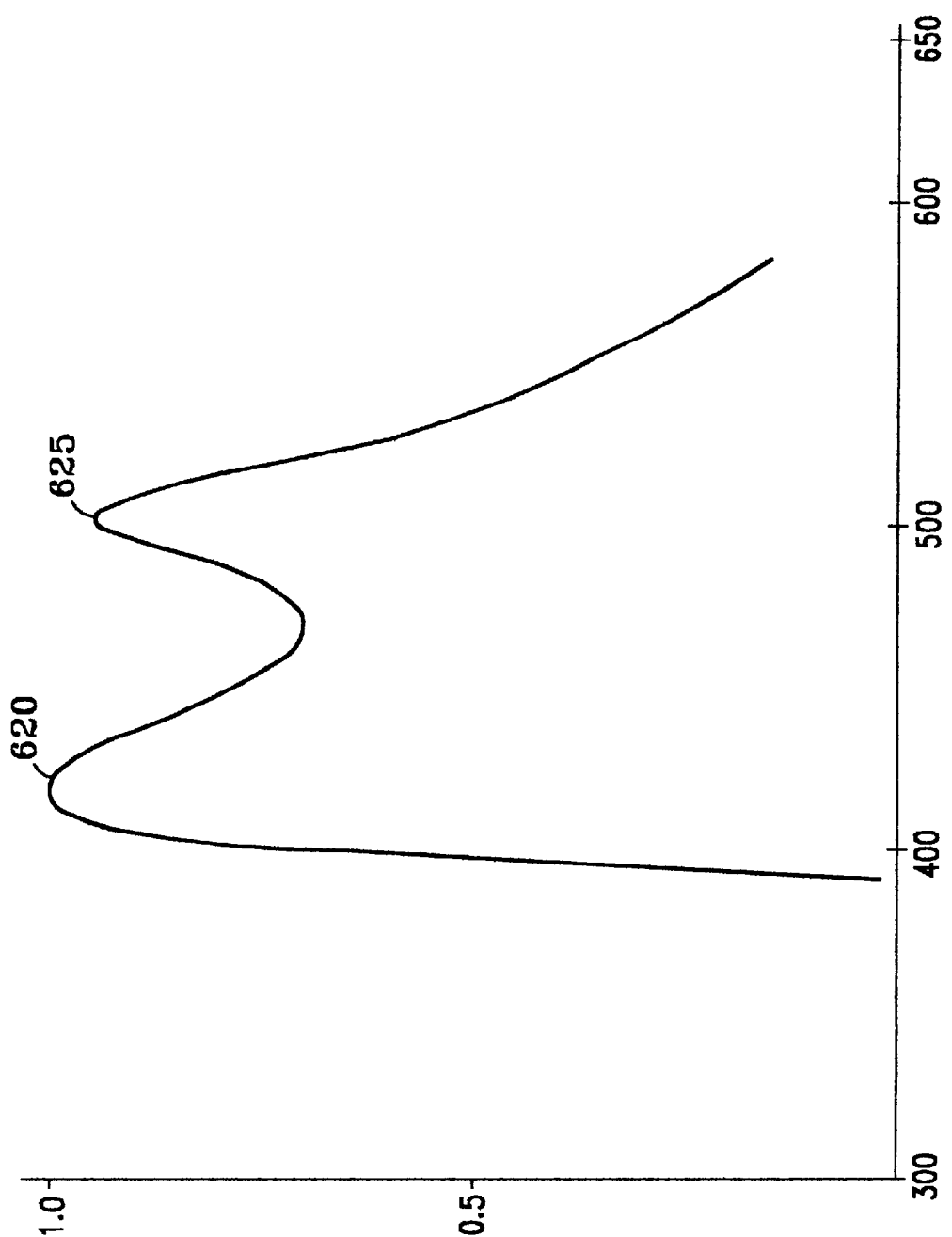
FIG. 20 is a graph of spectral emission measured from a phosphor made as in Example 16.

A phosphor was prepared by the general method of Example 1 above, depositing a thin film of hafnium over a thin film of zinc oxide deposited on a flat inert substrate, and heating the combination at 1200° C. for 2 minutes. FIG. 20 is a graph of spectral emission measured from a phosphor made as in Example 16, showing an emission peak 620 at about 350 nm in the violet region of the spectrum and an emission peak 625 at about 500 nm in the blue-green region of the spectrum.

The etch stop material is typically comprised of a refractory metal. However, other suitable materials can be used. Different materials can be used to modify the base phosphor selectively at different specific locations. This selective disposition of different substances can be used to make different spectral outputs at different locations. Dopants can be added to the etch stop material and, hence, are also incorporated into the base phosphor material to modify the spectral output. This may be also (or alternatively) done at specific locations by depositing the dopant(s) selectively. The selective disposition of dopants can be performed by ion implantation, for example.

Figure 6:
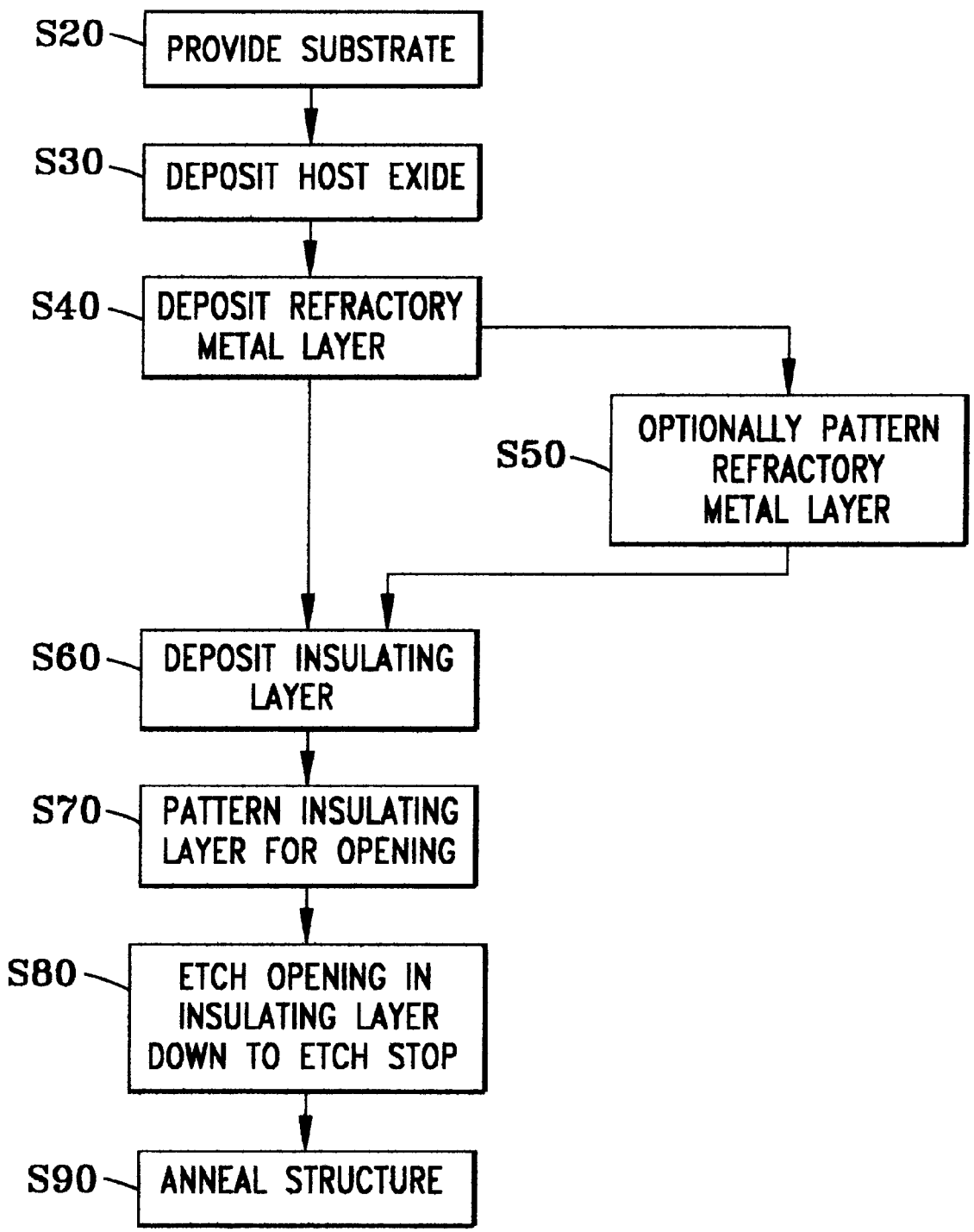
FIG. 6 is a flow chart illustrating a preferred process for in situ preparation of the phosphors.

The preferred fabrication method is described in detail below, with reference to FIG. 6, which is a flow chart illustrating the in situ process. Steps of the process are denoted by references S20, S30, . . . ,S90. A suitable substrate 20 is provided (S20). The substrate can be a conductive substrate, an insulating substrate, or an insulating substrate with patterned conductive portions, for example. In step S30, a host phosphor 30 such as zinc oxide is deposited on the substrate. A layer of a refractory metal 40 such as tantalum is then deposited (S40). If desired, the layer of refractory metal may be patterned (S50) by conventional patterning methods. A layer of insulator 50 is deposited (S60) over the refractory metal. The insulating layer is patterned (S70) to define an area for an opening 120. The insulator is etched (S80) to the etch stop provided by the refractory metal, to form an opening whose depth is precisely and automatically determined by the etch stop. In step S90, the entire structure is annealed to form the new phosphor material 35.

It will be understood by those skilled in the art that this preferred process description is an example only and does not limit the present invention to the particular materials, process conditions, or process sequence mentioned above. For example, there are numerous effective anneal conditions and many other refractory metals, such as, but not limited to, molybdenum, zirconium, titanium, and tungsten. There are also many dopants that can be used to dope the new phosphor, such as, but not limited to, manganese and/or chromium and/or lanthanides. Furthermore, there are many different types of substrates that can be used depending on the application. These include, but are not limited to, conductors, semi-conductors, insulators, and mixtures or composites thereof. Some suitable substrates are silicon, silicon oxide, silicon nitride, metallized silicon oxide, and glass.

The process just described may be usefully included and integrated as a sub-process in an overall process for fabrication of electron field-emission-device displays (FED). This method discloses an etch stop which may be used in a trench etch process such as the etch process of U.S. Pat. No. 5,618,216 to Potter, the entire disclosure of which is incorporated herein by reference. The etch stop material is also used to create the new low-voltage phosphor material of the present application. The etch stop solves the problem of over etching during the opening or trench formation process. It first protects the phosphor layer, and it subsequently participates in formation of the new phosphor. The etch stop layer does not need to be removed. After an anneal, it is incorporated into the phosphor layer and modifies the initial phosphor layer's luminescence, particularly the chromaticity of its cathodoluminescence.

The etch stop material is typically comprised of a refractory metal. However, other suitable materials can be used. Different materials can be used selectively to modify the base phosphor layer at specific locations or pixel sites in order to fabricate a display emitting light of more than one color, e.g. different colors for different pixels. Alternatively, dopants can be added to the etch stop material and, hence, also incorporated into the base phosphor layer material to modify the spectral output. This may be done selectively at specific selected locations for creating different color pixels, e.g. by ion implantation after annealing, followed by a re-anneal if necessary to incorporate the dopant.

Figure 7A:
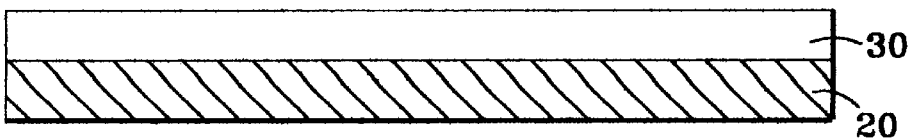
FIGS. 7a–7k are side elevation cross-sectional views of a display device structure made in accordance with the invention.
Figure 7B:
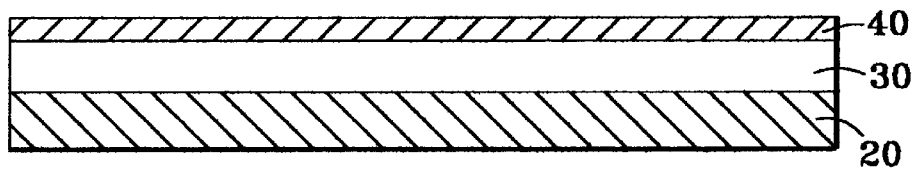
Figure 7C:
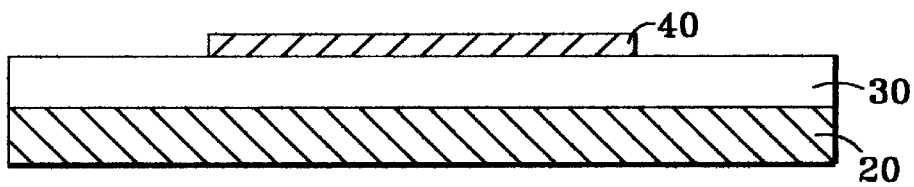
Figure 7D:
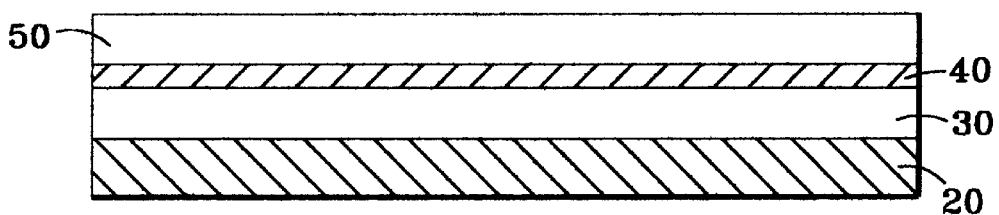
Figure 7E:
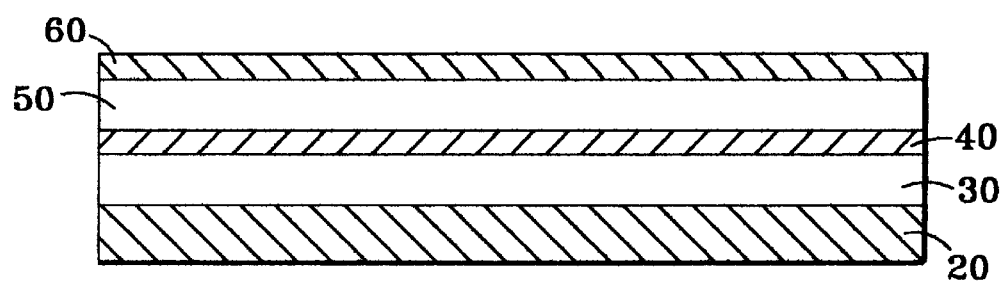
Figure 7F:
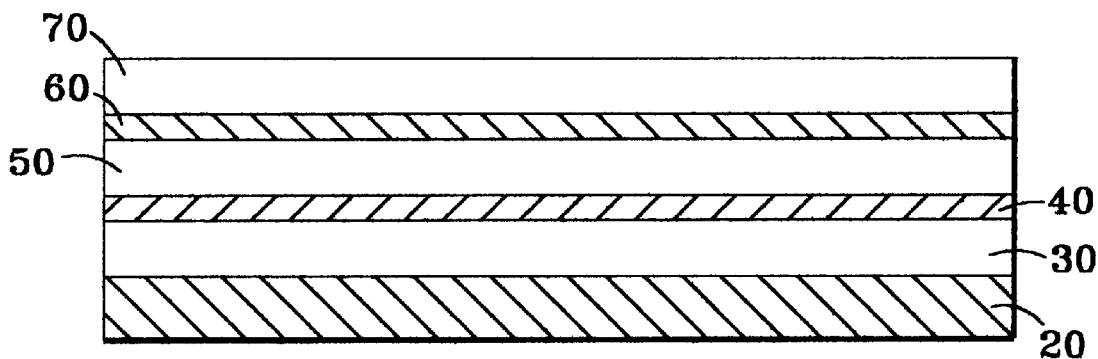
Figure 7G:
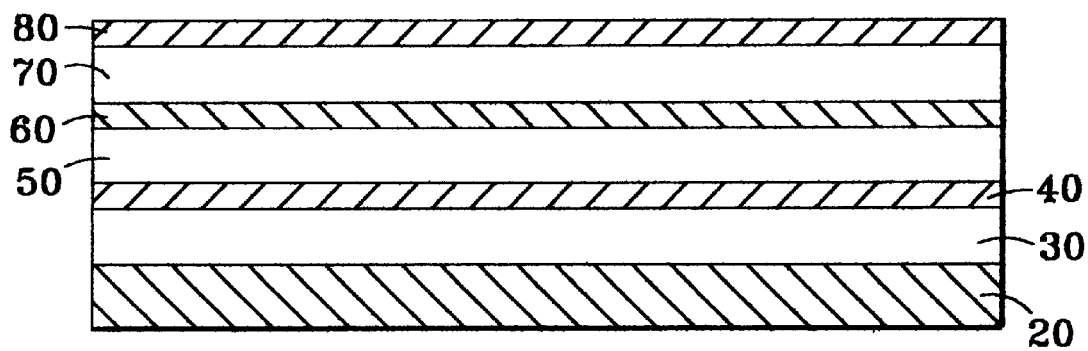
Figure 7H:
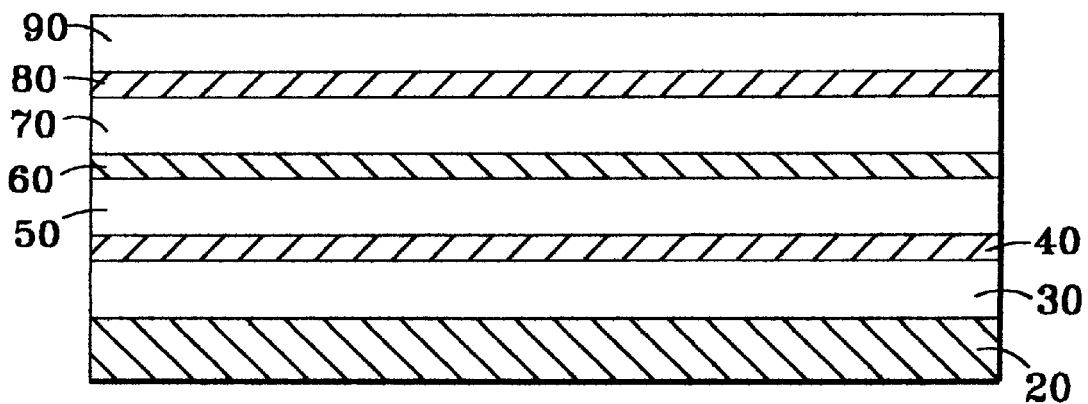
Figure 7I:
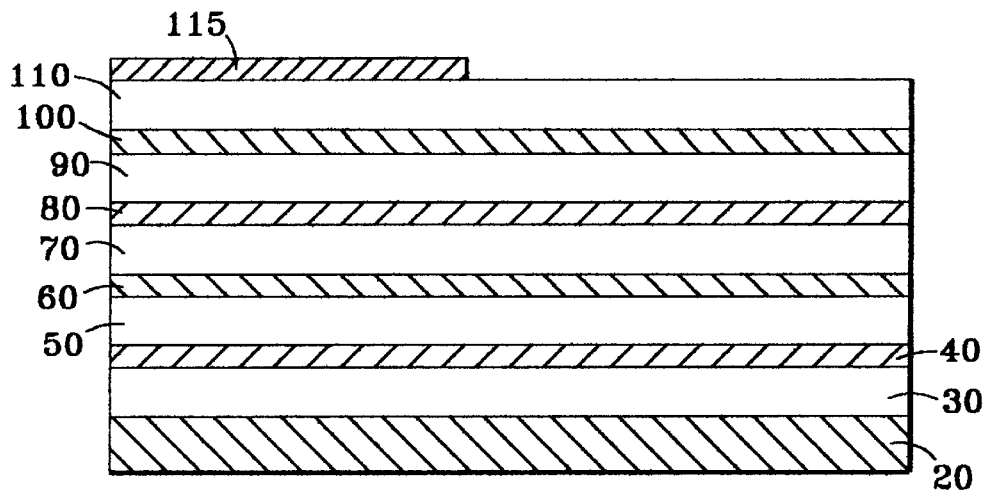
Figure 7J:
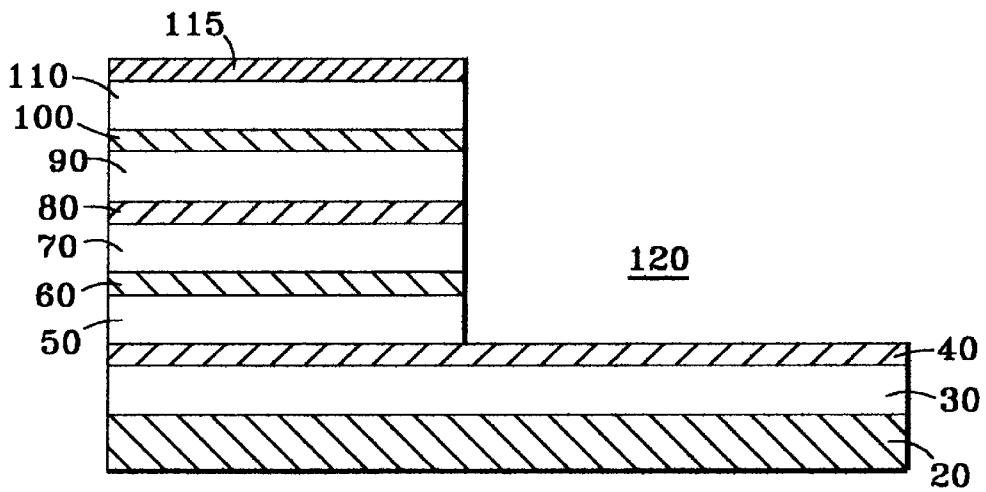
Figure 7K:
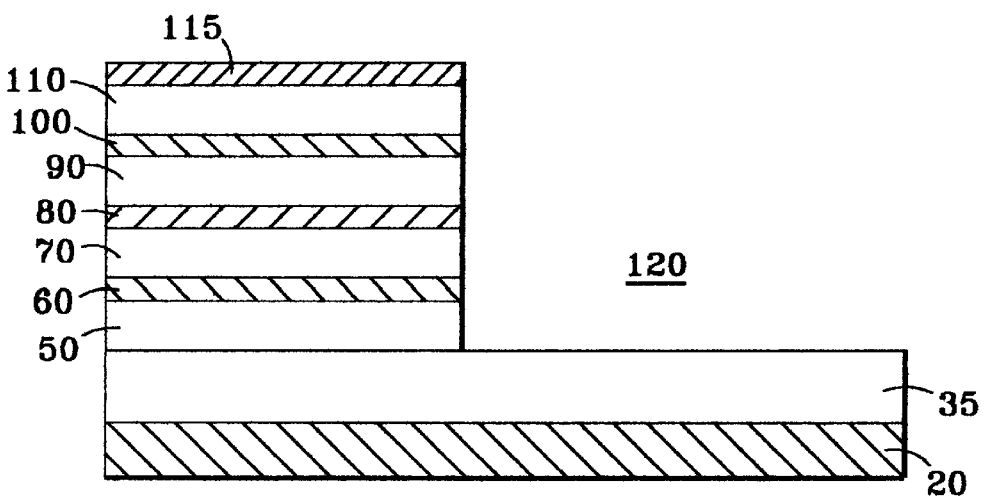
Figure 8:
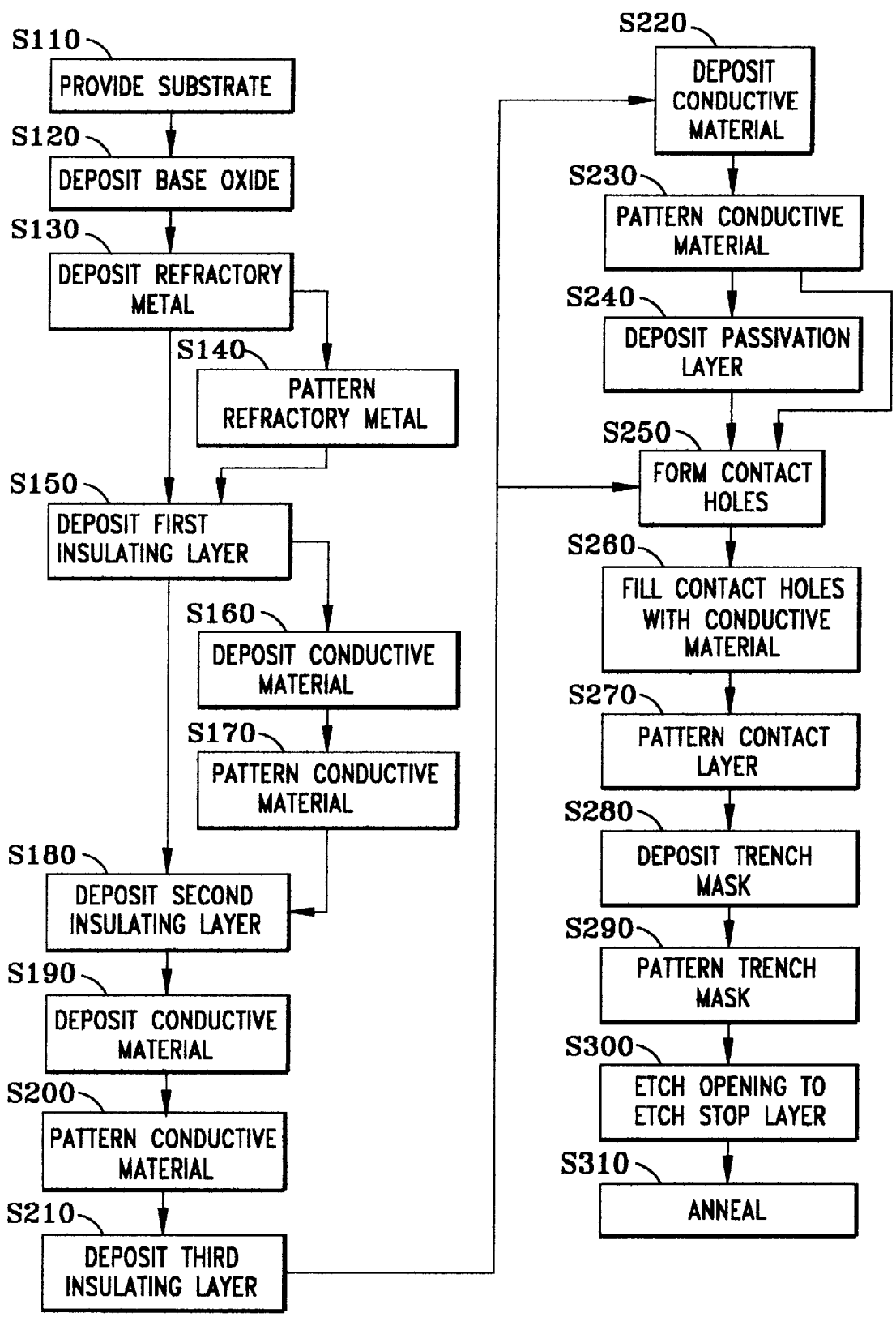
FIG. 8 is a flow chart illustrating a preferred process for fabricating the structure of FIG. 7k.

The preferred overall process for fabrication of electron field-emission-device displays is described in the following paragraphs, with reference to FIGS. 7a–7k and the flow chart of FIG. 8. The side elevation cross-section views of FIGS. 7a–7k are not drawn to scale. Steps of the process are denoted by references S110, S120, etc. For clarity, different step numbers are used within each process described in this specification, but the person of ordinary skill will recognize that several steps having different reference designations are equivalent. For example, the first step of the process to be described below is step S110, providing a suitable substrate, which is equivalent to steps S1 and S20 described above. For the present example the substrate 20 may be a flat conductive substrate. Once a suitable substrate 20 is provided (S110), a host (base) oxide 30 such as zinc oxide, tin oxide, indium oxide, indium-tin oxide, or cupric oxide is deposited (S120, FIG. 7a). A layer 40 of a refractory transition metal such as tantalum is deposited (S130) over the host (base) phosphor, FIG. 7b. If desired, the refractory metal layer 40 may be patterned (S140) as shown in FIG. 7c. A first insulating layer 50 is deposited (S150, FIG. 7d). If a lower gate element is desired, a conductive material 60 for a lower gate is deposited (S160, FIG. 7e) and patterned (S170, not shown in FIGS. 7a–7k). A second insulating layer 70 is deposited (S180, FIG. 7f). A thin film conductive emitter material 80 is deposited (S190, FIG. 7g) and patterned (S200). (Patterning that would be visible in a plan view is not shown in the cross-section views.) A third insulator 90 is deposited (S210, FIG. 7h). If an upper gate element is desired, a conductive material 100 for an upper gate is deposited (S220, FIG. 7i) and patterned (S230) (not shown in FIGS. 7a–7k). If a passivation layer is desired, a fourth insulating layer 110 is deposited (S240, FIG. 7i). Separate contact holes, spaced apart from each other, are formed (S250) from the upper surface to conductive layers such as the emitter layer and any gate layers, and conductive contact material is deposited (S260), filling the contact holes and forming a contact layer. The contact layer is patterned (S270) to provide contact patterns suitable to each type of contact (emitter, gate, etc.). The provision of contacts (S250–S270) is done in a conventional manner and is not shown in FIGS. 7a–7k. A trench mask 115 is deposited (S280) and patterned (S290), as shown in FIG. 7i. A trench opening 120 is etched (S300, FIG. 7j), which will stop on the etch stop provided by the refractory metal 40 deposited in step S130. Only the left side of opening 120 is shown in FIGS. 7j–7k; the right side is the same. The structure formed is annealed (S310, FIG. 7k), for example in a rapid thermal anneal in a nitrogen atmosphere for 10 seconds at 1200° C., to form phosphor layer 35 from base oxide layer 30 and refractory metal etch stop layer 40. It will be understood by those skilled in the art that the foregoing preferred process description is by way of example only and does not limit the invention to the particular materials, process conditions, or process sequence mentioned. A particular useful variation is to form the phosphor 35 in situ by annealing or heating (S310) before etching (S300) the opening 120, so that the phosphor itself serves as the etch stop that defines the depth of the opening 120. Instead of the elemental refractory metal, refractory metal layer 40 may be a substance containing the refractory metal, such as an oxide of a refractory metal, e.g., tantalum pentoxide instead of tantalum metal.

Dopant substances may be added in various ways before heating the other components, e.g. during preparation of a powder phosphor by mixing a quantity of dopant with the other starting materials, or co-deposited with the base oxide or the refractory metal during the thin-film processes, for example. While amounts of dopants up to about 10 atomic percent may be used, preferred amounts are 5 atomic percent or less. For low-electron-energy cathodoluminescence applications, any dopant used may be incorporated in only a thin surface layer on otherwise un-doped phosphor, as long as the doped surface region thickness exceeds the small penetration depth of such low-energy electrons.

Thus one aspect of the invention is a phosphor comprising, in atomic percentages, 90% to 100% of a mixed metal oxide MxTyOz, wherein M is a metal selected from Zn, Sn, In, Cu, and combinations thereof, T is a refractory metal selected from Ti, Zr, Hf, V, Nb, Ta, Cr, Mo, W, and combinations thereof, and O is Oxygen, x, y, and z being chosen such that z is at most stoichiometric for MxTyOz; and also comprising 0% to 10% of a dopant comprising a substance selected from a rare earth element of the lanthanide series, Mn, Cr, and combinations thereof. Other aspects of the invention include methods for making such phosphors in thin-film form, in powder form, and in the form of a solid mass for use as a sputtering target. Another aspect of the invention is a particular method for forming such phosphors in situ on a substrate. A particular aspect of that method is an integrated etch-stop and phosphor-forming process, which is specially adapted for fabricating a field-emission display cell structure. Such field-emission display cell structures have a field-emission cathode and an anode comprising at least one of the phosphors of the present invention. They may also have one or more gate elements for controlling the electron current that flows from the cathode to the anode of the field emission devices when suitable electrical bias voltages are applied. They may have more than one phosphor, and in particular may have red, green, and blue phosphors selectively arranged. For example, each pixel site may have one anode of each color phosphor. The selective arrangement of various color phosphors is done, in preferred embodiments, by selective deposition of suitable dopants. That dopant deposition may be done with appropriate masking and chemical vapor deposition, or by selective ion implantation, for example. Yet another aspect of the invention is a display composed of one or more such field-emission display cell structures, each cell being formed by the processes described hereinabove.

From the foregoing description, one skilled in the art can easily ascertain the essential characteristics of this invention, and without departing from the spirit and scope thereof, can make various changes and modifications of the invention to adapt it to various usages and conditions. Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, numerous effective anneal conditions may be used, and many refractory transition metals are available, such as tantalum, chromium, molybdenum, vanadium, niobium, zirconium, tungsten, hafnium, or titanium. There are many dopants that can be used to dope the new phosphors, such as manganese, chromium, and the rare earth elements of the lanthanide series. In one variation of the sequence for instance, the base phosphor oxide can be deposited (step S120) after the trench-forming step S300. Uses of the phosphors and associated processes and/or structures can include many diverse applications, such as gamma-ray pinhole photography, for example. Accordingly, the scope of the invention should be determined not by the embodiments illustrated, but by the appended claims and their equivalents.

Having described my invention, I claim:

1. A phosphor made by performing the steps of:
   a) mixing a quantity of zinc oxide (ZnO) with a quantity of tantalum pentoxide ($Ta_2O_5$) to form a mixture;
   b) adding a quantity of water to said mixture to form a slurry;
   c) ball milling and drying said slurry to provide a dry intermediate mixture;
   d) heating said dry intermediate mixture at 900° C. or higher;
   e) granulating the resultant material to a fine powder;
   f) mixing an organic polymer with said fine powder as a binder;
   g) pressing the resultant material into a solid mass; and then firing said solid mass at a effective temperature and time at 900° C. or higher for at least about 1 hour to form $Ta_2Zn_3O_8$.

2. A phosphor made by performing the steps of claim 1, wherein said organic polymer is selected from the list consisting of polyvinyl alcohol, cellulose acetate butyrate, a polyalkyl methacrylate, a polyvinyl-n-butyral, a copoly-(vinyl acetate/vinyl chloride), a copoly-(acrylonitrile/butadiene/styrene), a copoly-(vinyl chloride/vinyl acetate/vinyl alcohol), and a mixture thereof.

3. A phosphor made by performing the steps of:
   a) providing a substrate;
   b) depositing a first layer of a first metal oxide or of a compound capable of being converted by heat treatment to said first metal oxide wherein said first metal oxide comprises tin oxide;
   c) depositing a second layer of a substance containing a refractory metal, said refractory metal comprising tantalum, at least one of said first and second layers being disposed on said substrate; and
   d) heating said first and second layers at an effective temperature of about 900° C. or higher for reacting at least a portion of said first metal oxide and said refractory metal to form a mixed oxide thereof.

4. A phosphor made by performing the steps of:
   a) providing a substrate;
   b) depositing a first layer of a first metal oxide or of a compound capable of being converted by heat treatment to said first metal oxide, wherein said first metal oxide comprises indium-tin oxide (ITO);
   c) depositing a second layer of a substance containing a refractory metal, said refractory metal comprising tantalum, at least one of said first and second layers being disposed on said substrate; and
   d) heating said first and second layers at an effective temperature of about 900° C. or higher for reacting at least a portion of said first metal oxide and said refractory metal to form a mixed oxide thereof.

5. A phosphor made by performing the steps of:
   a) providing a substrate;
   b) depositing a first layer of a first metal oxide or of a compound capable of being converted by heat treatment to said first metal oxide, wherein said first metal oxide comprises cupric oxide;
   c) depositing a second layer of a substance containing a refractory metal, said refractory metal comprising tantalum, at least one of said first and second layers being disposed on said substrate; and
   d) heating said first and second layers at an effective temperature of about 900° C. or higher for reacting at least a portion of said first metal oxide and said refractory metal to form a mixed oxide thereof.

* * * * *